US012568258B2

(12) United States Patent
Chen et al.

(10) Patent No.: US 12,568,258 B2
(45) Date of Patent: Mar. 3, 2026

(54) SEAMLESSLY INSERTING A SUPPLEMENTAL CONTENT ITEM INTO A CONTENT ITEM

(71) Applicant: Adeia Guides Inc., San Jose, CA (US)

(72) Inventors: Tao Chen, Palo Alto, CA (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 15 days.

(21) Appl. No.: 18/503,858

(22) Filed: Nov. 7, 2023

(65) Prior Publication Data

US 2025/0150651 A1    May 8, 2025

(51) Int. Cl.
| *H04N 21/23* | (2011.01) |
| *H04N 21/234* | (2011.01) |
| *H04N 21/239* | (2011.01) |
| *H04N 21/262* | (2011.01) |
| *H04N 21/44* | (2011.01) |

(52) U.S. Cl.
CPC . *H04N 21/23424* (2013.01); *H04N 21/23418* (2013.01); *H04N 21/2393* (2013.01); *H04N 21/262* (2013.01); *H04N 21/44004* (2013.01)

(58) Field of Classification Search
None
See application file for complete search history.

(56) References Cited

U.S. PATENT DOCUMENTS

| 8,347,344 | B2 * | 1/2013 | Makhija | ............. | H04N 21/2402 |
| | | | | | 725/19 |
| 10,880,585 | B1 * | 12/2020 | Waggoner | ............. | H04N 19/64 |

| 11,245,935 | B1 | 2/2022 | Shams et al. |
| 2014/0365675 | A1 | 12/2014 | Bhardwaj et al. |
| 2020/0413139 | A1 | 12/2020 | Ickin |
| 2021/0014542 | A1 | 1/2021 | Jimenez et al. |
| 2022/0101013 | A1 * | 3/2022 | Chatoo | ............ H04N 21/23418 |

OTHER PUBLICATIONS

YouTube's lowered mid-roll ad requirement may lead to shorter videos from publishers—Digiday by Tim Peterson Jul. 24, 2020.

(Continued)

*Primary Examiner* — Cai Y Chen
(74) *Attorney, Agent, or Firm* — HALEY GUILIANO LLP

(57) ABSTRACT

The present disclosure relates to methods and systems, implemented by a device such as a client device, for seamlessly inserting a supplemental content item into a content item to negate the user's need for rewinding to a point prior to the interruption of the content item by the supplemental content item. The client device accesses the supplemental content insertion logic to identify a default supplemental content insertion point between two consecutive segments of the content item. The client device analyzes the two consecutive segments of the content item to identify a natural supplemental content insertion point within one of the two consecutive segments. The client device then decodes a first set of frames of the content item up to the natural supplemental content insertion point, a second set of frames of the supplemental content item and a third set of frames of the content item from the natural supplemental content insertion point. The client device places these three sets of frames in a buffer and plays the frames from the buffer.

20 Claims, 12 Drawing Sheets

(56)            References Cited

OTHER PUBLICATIONS

YouTube Threatens to Cut off Ad Blocker Users After Just Three Ad-less Vids (gizmodo.com) by Kyle Barr, published Jun. 30, 2023.

Manage mid-roll ad breaks in long videos—YouTube Help (google.com) Printed on Dec. 5, 2023.

Z, Liu, "A deep neural framework to detect individual advertisement (ad) from videos," in Proceedings of IEEE/CVF WACV, 2023.

R. Tapu, et al., "Deep-Ad: A Multimodal Temporal Video Segmentation Framework for Online Video Advertising," IEEE Access, May 2020.

MPEG-4, Advanced Video Coding (Part 10) (H.264), H.264: Advanced video coding for generic audiovisual services (itu.int) Approved in Aug. 22, 2021.

MPEG-H Part 2, High Efficiency Video Coding H.265 : High efficiency video coding (itu.int) Approved in Aug. 22, 2021.

Thomas Stockhammer (Qualcomm): "[Dash] Content Replacement and Ad Insertion Event", 126. MPEG Meeting; Mar. 25, 2019-Mar. 29, 2019; Geneva; (Motion Picture Expert Group or ISO/IEC JTC1/SC29/WG11), No. m47557, Mar. 20, 2019, Retrieved from the Internet: http://phenix.int-evry.fr/mpeg/doc_end_user/documents/126_Geneva/ wg11 /m47557-v1-ContentReplacementinliveContent-r3.zip Content Replacement in Live Content - r3.docx [retrieved on Mar. 20, 2019], pp. 10.

* cited by examiner

Fig. 1

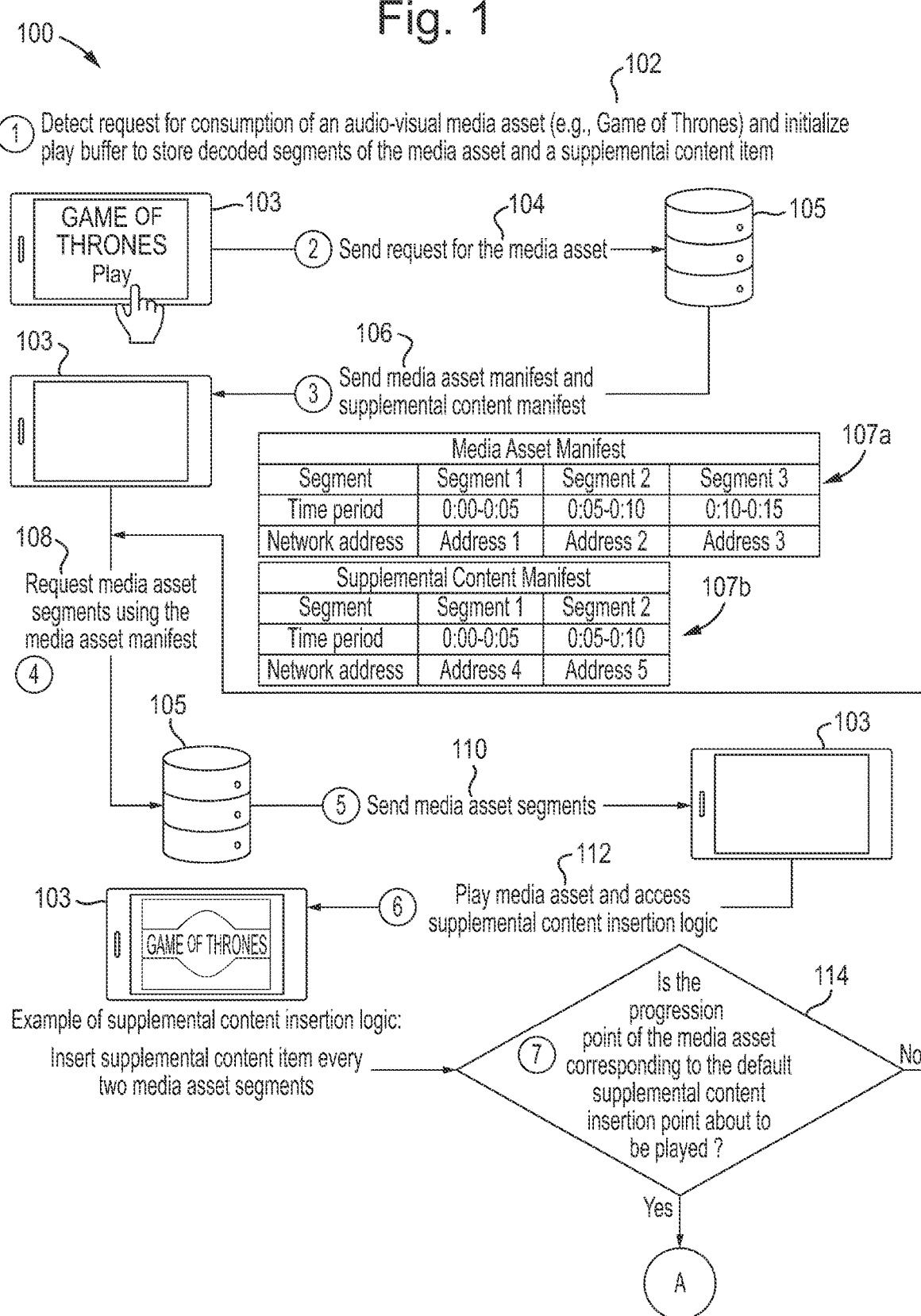

100

① Detect request for consumption of an audio-visual media asset (e.g., Game of Thrones) and initialize play buffer to store decoded segments of the media asset and a supplemental content item

102

GAME OF THRONES
Play

103

② Send request for the media asset

104

105

③ Send media asset manifest and supplemental content manifest

106

103

| Media Asset Manifest | | | | 107a |
|---|---|---|---|---|
| Segment | Segment 1 | Segment 2 | Segment 3 | |
| Time period | 0:00-0:05 | 0:05-0:10 | 0:10-0:15 | |
| Network address | Address 1 | Address 2 | Address 3 | |

| Supplemental Content Manifest | | | 107b |
|---|---|---|---|
| Segment | Segment 1 | Segment 2 | |
| Time period | 0:00-0:05 | 0:05-0:10 | |
| Network address | Address 4 | Address 5 | |

108

Request media asset segments using the media asset manifest

④

105

⑤ Send media asset segments

110

103

112

Play media asset and access supplemental content insertion logic

103

GAME OF THRONES

⑥

Example of supplemental content insertion logic:
Insert supplemental content item every two media asset segments ⑦ Is the progression point of the media asset corresponding to the default supplemental content insertion point about to be played ?

114

No

Yes

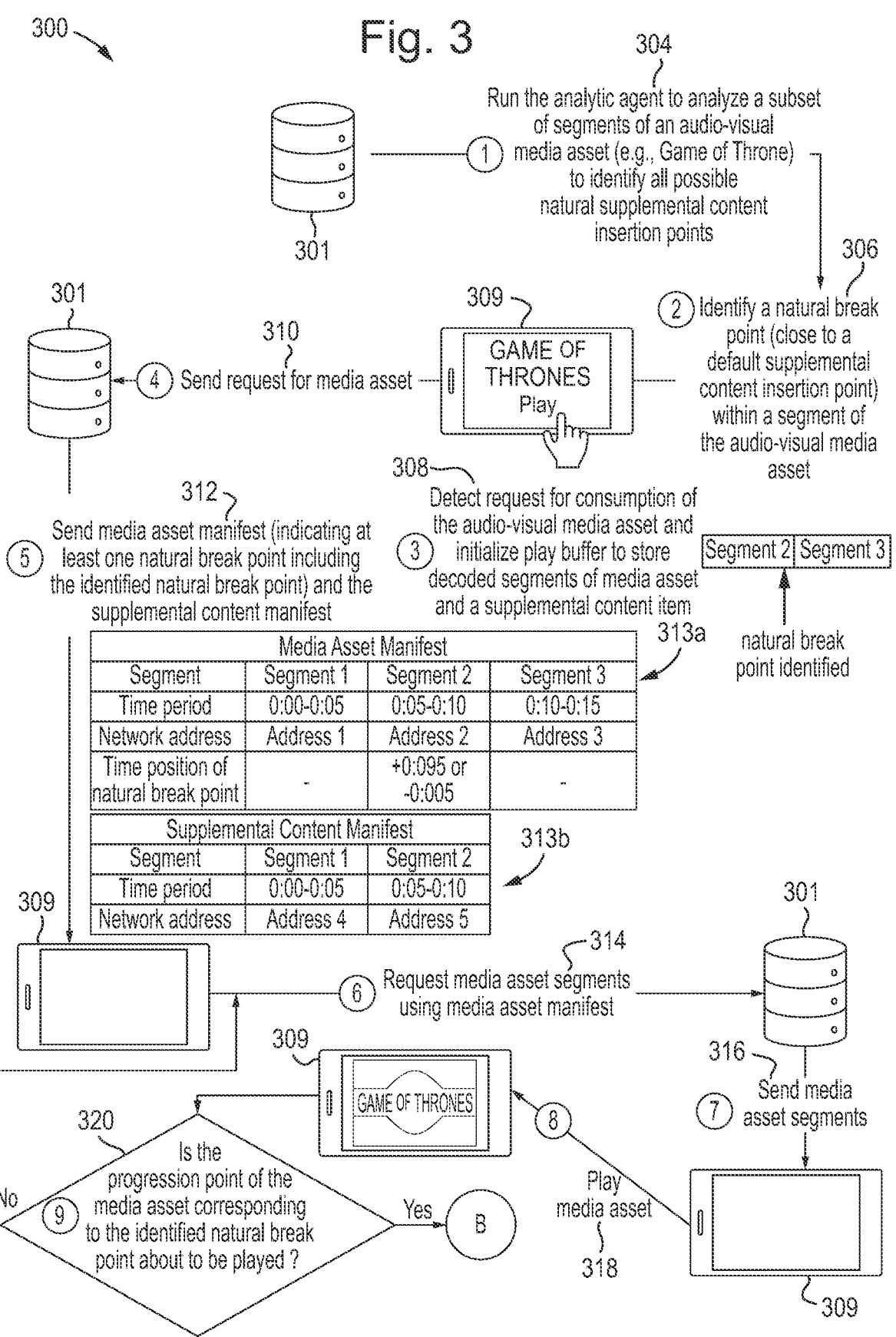

300

301

Run the analytic agent to analyze a subset of segments of an audio-visual media asset (e.g., Game of Throne) to identify all possible natural supplemental content insertion points — 304

① 301

② Identify a natural break point (close to a default supplemental content insertion point) within a segment of the audio-visual media asset — 306

GAME OF THRONES Play — 309

④ Send request for media asset — 310

⑤ Send media asset manifest (indicating at least one natural break point including the identified natural break point) and the supplemental content manifest — 312

③ Detect request for consumption of the audio-visual media asset and initialize play buffer to store decoded segments of media asset and a supplemental content item — 308

| Segment 2 | Segment 3 |

313a — natural break point identified

| Media Asset Manifest | | | |
|---|---|---|---|
| Segment | Segment 1 | Segment 2 | Segment 3 |
| Time period | 0:00-0:05 | 0:05-0:10 | 0:10-0:15 |
| Network address | Address 1 | Address 2 | Address 3 |
| Time position of natural break point | - | +0:095 or -0:005 | - |

| Supplemental Content Manifest | | | 313b |
|---|---|---|---|
| Segment | Segment 1 | Segment 2 | |
| Time period | 0:00-0:05 | 0:05-0:10 | |
| Network address | Address 4 | Address 5 | |

309

⑥ Request media asset segments using media asset manifest — 314

301

316 — ⑦ Send media asset segments

309 GAME OF THRONES

⑧ Play media asset — 318

309

320 — ⑨ Is the progression point of the media asset corresponding to the identified natural break point about to be played?   No   Yes   B

Figure 7:
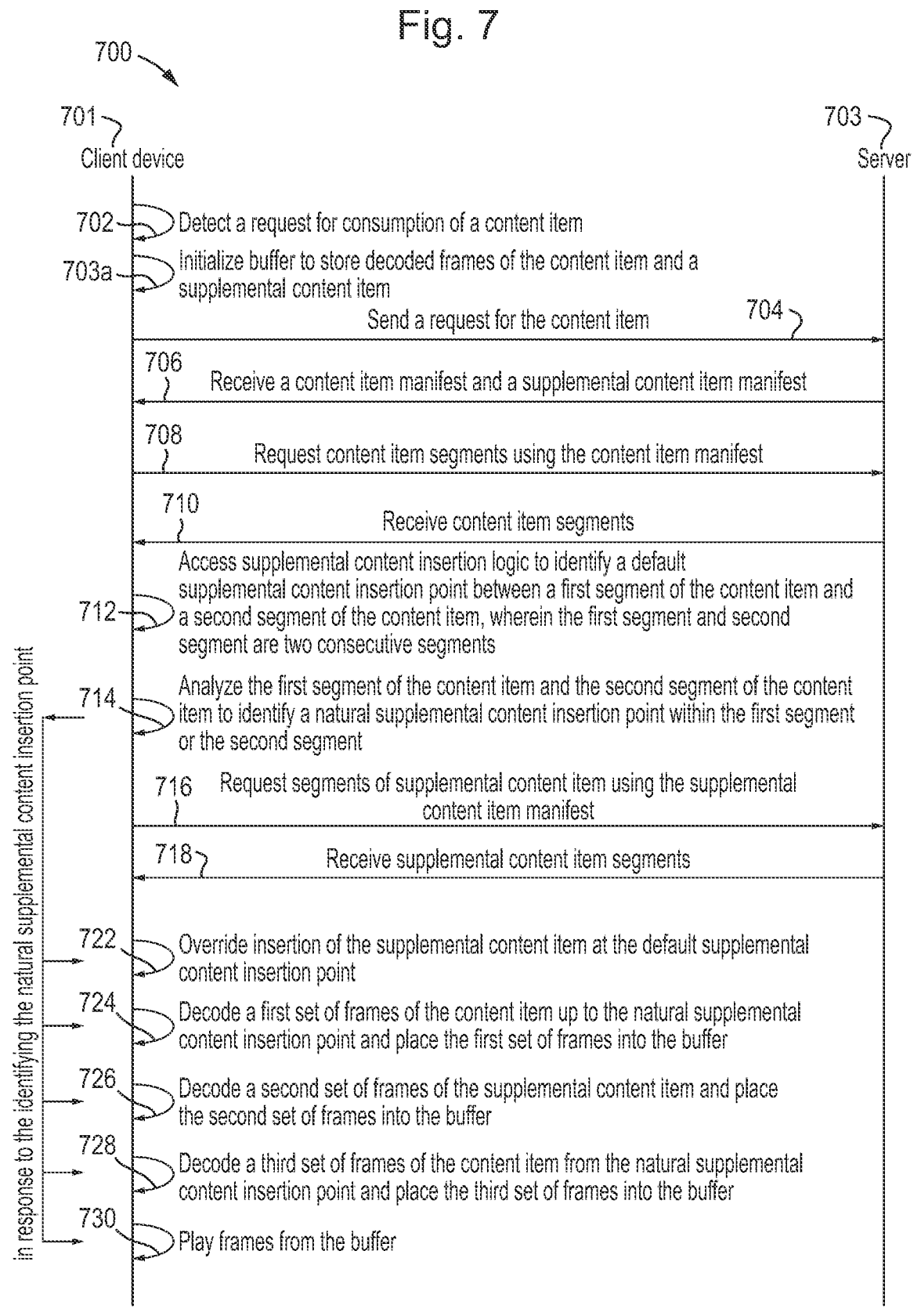

701
Client device

703
Server

702 — Detect a request for consumption of a content item

703a — Initialize buffer to store decoded frames of the content item and a supplemental content item Send a request for the content item          704

706 Receive a content item manifest and a supplemental content item manifest

708 Request content item segments using the content item manifest

710 Receive content item segments

712 — Access supplemental content insertion logic to identify a default supplemental content insertion point between a first segment of the content item and a second segment of the content item, wherein the first segment and second segment are two consecutive segments 714 — Analyze the first segment of the content item and the second segment of the content item to identify a natural supplemental content insertion point within the first segment or the second segment 716 Request segments of supplemental content item using the supplemental content item manifest 718 Receive supplemental content item segments 722 — Override insertion of the supplemental content item at the default supplemental content insertion point 724 — Decode a first set of frames of the content item up to the natural supplemental content insertion point and place the first set of frames into the buffer 726 — Decode a second set of frames of the supplemental content item and place the second set of frames into the buffer 728 — Decode a third set of frames of the content item from the natural supplemental content insertion point and place the third set of frames into the buffer 730 — Play frames from the buffer in response to the identifying the natural supplemental content insertion point

Fig. 8

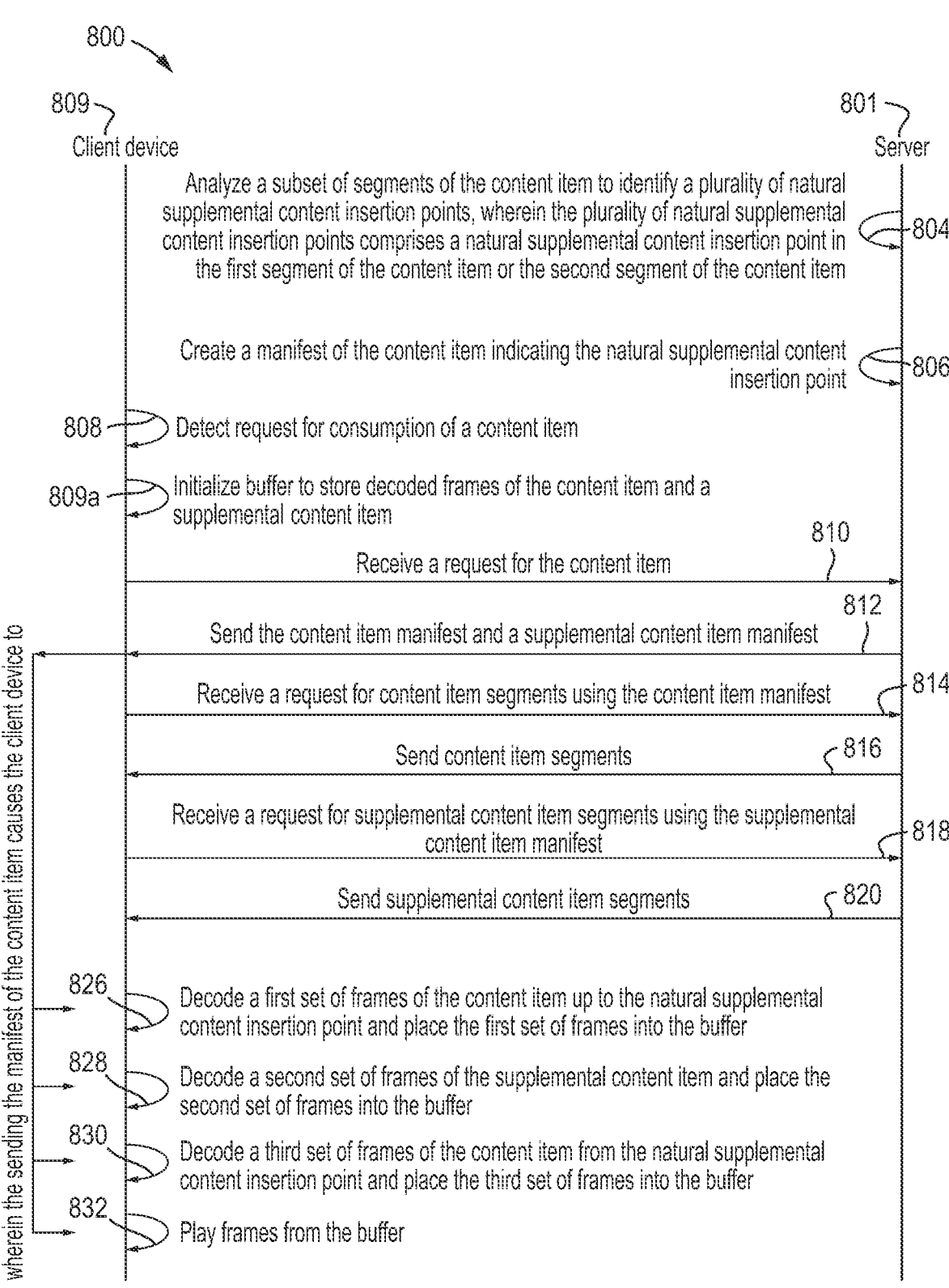

800

809
Client device

801
Server

Analyze a subset of segments of the content item to identify a plurality of natural supplemental content insertion points, wherein the plurality of natural supplemental content insertion points comprises a natural supplemental content insertion point in the first segment of the content item or the second segment of the content item —804

Create a manifest of the content item indicating the natural supplemental content insertion point —806

808 — Detect request for consumption of a content item

809a — Initialize buffer to store decoded frames of the content item and a supplemental content item 810
Receive a request for the content item 812
Send the content item manifest and a supplemental content item manifest 814
Receive a request for content item segments using the content item manifest 816
Send content item segments 818
Receive a request for supplemental content item segments using the supplemental content item manifest 820
Send supplemental content item segments 826 — Decode a first set of frames of the content item up to the natural supplemental content insertion point and place the first set of frames into the buffer 828 — Decode a second set of frames of the supplemental content item and place the second set of frames into the buffer 830 — Decode a third set of frames of the content item from the natural supplemental content insertion point and place the third set of frames into the buffer 832 — Play frames from the buffer wherein the sending the manifest of the content item causes the client device to

SEAMLESSLY INSERTING A SUPPLEMENTAL CONTENT ITEM INTO A CONTENT ITEM

BACKGROUND

The present disclosure relates to methods and systems for seamlessly inserting a supplemental content item into a content item so as to reduce disruption to the content item by insertion of the supplemental content item.

SUMMARY

For quite some time, Over-The-Top (OTT) media service platforms e.g., Netflix™, Amazon™ Prime, Disney™+, have been proposing catalogs of audio-visual content items exempt of supplemental content, to be streamed or played by their members. Some OTT media service platforms have been now offering memberships where the consumption of audio-visual content items includes the automatic consumption of supplemental content.

In some approaches, when a user device requests, from a server, an audio-visual content item to consume, upon the input made via a user interface, the server forwards, to the user device, a manifest which contains information about the plurality of segments constituting the to-be-consumed content item (e.g., number of segments, size, length expressed as a duration, available bit rates/resolutions, URL address of the audio and/or video segments, etc.). The user device then requests the content-item segments from the server using the manifest. The content-item segments are encoded (e.g., pre-encoded at a prior time or encoded in real-time), to reduce the quantity of information travelling through the communication network connecting the user device and the server. The user device receives each segment as a group of pictures, which encodes a set of frames. The user device also receives encoded audio data, that when decoded is synchronized with frames of the video segment. The user device then decodes the encoded frames using a decoder and sequentially places them in a buffer so as to be played by the user device. Similarly, the user device decodes encoded audio data associated with each frame and synchronizes playing of the audio data with playing of frames from the buffer.

In such approaches, the insertion of the segments of the supplemental content item into the sequence of the segments of the content item is implemented, on a server, via the use of software that places references, such as location of the supplemental content item segments to be inserted or displayed in between two consecutive content item segments. However, in practice, supplemental content items keep being inserted at undesirable points (e.g., mid-sentence, mid-word or during the playing of music or a song) in the content item, which results in unnatural interruption of the content item. In effect, the content item is already interrupted by a forced switching from the content item to the supplemental content item (and vice versa) and the severity of the interruption is further worsened when the supplemental content item is presented at an unnatural point e.g., mid-sentence, mid-word, during the playing of music or a song.

Such unnatural interruption often causes decrease in comprehension which may result in rewinding of the content item to a point prior to the interruption. The unnecessary rewinding of the content item leads to the unnecessary consumption, by the user device, of computing resources to re-play the item, network resources to re-send replayed portions of the content, and energy needed to perform the replay functionality.

Other approaches insert supplemental content segments within a content item segment to ensure the insertion of a supplemental content item into a content item at a natural point e.g., at the end of a sentence, at the end of a music or a song. In effect, when considering two consecutive segments of the content item, there are more natural points within them than in between them. Nevertheless, the insertion of a supplemental content item within a content item segment leads to the shortening of the content-item segments and thus the shortening of the supplemental content item segments (as both the content item segments and the supplemental content item segments should have the same size). This, in turn, requires the use of additional Instantaneous Decoder Refresh (IDR) or intra-coded pictures and makes the time-consuming and costly re-optimization of the parameters controlling the segment size-dependent encoding process inevitable, causing the use of additional computing resources and energy to re-encode the content item and the supplemental content item. In addition, inserting additional IDR or intra-coded pictures also increases the bitrate of encoded streams.

There is thus a need for affordable and energy-efficient methods and systems for seamlessly inserting a supplemental content item into a content item, that rationalize the use of computing resources, network resources and energy.

Methods and systems are provided herein for seamlessly inserting, in some embodiments implemented by a client device (e.g., a user device), a supplemental content item into a content item. In some examples, non-transitory computer-readable instructions encoded on a non-transitory computer-readable medium and executed by control circuitry of the client device seamlessly insert a supplemental content item into a content item.

In some approaches, the client device and a server are connected via a communication network (e.g., LAN or WAN). The client device sends a request for a content item via the communication network. The client device receives at least a manifest for the content item via the communication network. The manifest for the content item contains information about the plurality of segments constituting the content item (e.g., number of segments, size, length expressed as a duration, available bit rates/resolutions, URL address of the audio and/or video segments, etc.). In some examples, the manifest for the content item can contain information about the plurality of segments constituting the supplemental content item (e.g., number of segments, size, length expressed as a duration, available bit rates/resolutions, URL address of the audio and/or video segments, etc.) to be seamlessly inserted into the content item. In some examples, the client device receives a manifest for the content item and a manifest for the supplemental content item via the communication network. The manifest for the supplemental content item contains information about the plurality of segments constituting the supplemental content item (e.g., number of segments, size, length expressed as a duration, available bit rates/resolutions, URL address of the audio and/or video segments, etc.). In some examples, the supplemental content item does not contain segments and is simply a .mp4 file that can be e.g., a 15-seconds long file. In some instances, the supplemental content item comprises a pod of 4 different supplemental content sub-items, wherein each supplemental content sub-item is e.g., a 15-seconds .mp4 file.

The client device accesses a supplemental content insertion logic to identify a default supplemental content insertion point between a first segment of the content item and a second segment of the content item, wherein the first segment and second segment are two consecutive segments. In some examples, non-transitory computer-readable instructions encoded on a non-transitory computer-readable medium and executed by control circuitry of the client device comprise the supplemental content insertion logic. In some examples, the first segment of the content item and the second segment of the content item are any one of two consecutive segments of the sequence of segments of the content item corresponding to the entire runtime of the content item.

In some approaches, the client device analyzes the first segment of the content item and the second segment of the content item to identify a natural supplemental content insertion point within the first segment or the second segment, using an analytic agent. The natural supplemental content insertion point is, for instance, a point in between two consecutive portions of the first segment (i.e., within the first segment) or two consecutive portions of the second segment (i.e. within the second segment), at which the insertion of a supplemental content item does not cause unnatural interruption of the content item by the supplemental content item. The natural supplemental content insertion point is, for instance, a point in between two consecutive segments i.e. in between the first segment and the second segment or more precisely in between a boundary portion of the first segment and a boundary portion of the second segment) at which the insertion of a supplemental content item does not cause unnatural interruption of the content item by the supplemental content item. Natural supplemental content insertion points are more preferentially distributed within a segment than in between two consecutive segments. If there is no natural supplemental content insertion points in between the first segment and the second segment, within the first segment or within the second segment, the client device analyzes other segments of the content item such as a third segment and a fourth segment, wherein the third segment is consecutive to the first segment and spaced apart from the default supplemental content insertion point by the first segment; and wherein the fourth segment is consecutive to the second segment and spaced apart from the default supplemental content insertion point by the second segment. The client device continues to analyze segments until at least one natural supplemental content insertion point is found. In some examples, non-transitory computer-readable instructions encoded on a non-transitory computer-readable medium and executed by control circuitry of the client device comprise instructions to control the analytic agent that identifies a natural supplemental content insertion point within the first segment or the second segment. In some instances, the instructions to control the analytic agent comprises a machine learning model, which distinguishes words of various languages from encoded audio data and closed captions from encoded frames and can identify the beginning and end of sentences, songs and music and monochromatic frames.

In some approaches, in response to the identifying the natural supplemental content insertion point, the client device overrides the insertion of the supplemental content item at the default supplemental content insertion point. In addition, the client device decodes a first set of frames of the content item up to the natural supplemental content insertion point and places the first set of frames into a buffer. Furthermore, the client device decodes a second set of frames of the supplemental content item and places the second set of frames into the buffer. Moreover, the client device decodes a third set of frames of the content item from the natural supplemental content insertion point, and places the third set of frames into the buffer. In some examples, the client device decodes the first set of frames, the second set of frames and the third set of frames using a single decoder. Alternatively, the client device decodes the first set of frames of the content item and the third set of frames of the content item using a first decoder while the client device decodes the second set of frames of the supplemental content item using a second decoder.

In some approaches, in response to the identifying the natural supplemental content insertion point, the client device plays frames from the buffer. In some examples, the client device plays the decoded frames following the order of arrival of the decoded frames in the buffer e.g., when the order of arrival of the decoded frames in the buffer is/first set of frames/second set of frames/third set of frames/so as to play the supplemental content item-inserted content item. Alternatively, the client device plays the decoded frames following an order established by a buffer manager, e.g., when the order of playing is to be kept as/first set of frames/second set of frames/third set of frames/at all times (so as to play the supplemental content item-inserted content item) or when the order of arrival of the decoded frames in the buffer deviates from/first set of frames/second set of frames/third set of frames/(corresponding to the playing of the supplemental content item-inserted content item) because of a combination of client device parameters (e.g., type of codec used for encoding and decoding, number of decoders employed, times at which each decoder starts to operate) and external parameters (e.g., available bandwidth of the communication network connecting the client device to the server, data quantity contained in each segment corresponding to the first, second and third sets of frames). In some examples, the client device plays the frames while populating the buffer. Alternatively, the client device plays the frames after having populated the buffer. In some instances, non-transitory computer-readable instructions encoded on a non-transitory computer-readable medium and executed by control circuitry of the client device comprise instructions controlling the buffer manager.

In such embodiments, these methods and systems allow the client device to insert a supplemental content item into a content item at a natural supplemental content insertion point located within a content item segment, avoiding the unnatural interruption of the content item by the supplemental content item and the resulting need for rewinding the content item to a point prior to the unnatural interruption. These methods and systems also avoid the re-encoding (on the server side) of the content item and the supplemental content item that should normally result from the decrease of the size of the content item segments and supplemental content item segments due to the insertion of the supplemental content item, by the client device, within a content item segment. In effect, the client device inserts the supplemental content item into the content item after having decoded the first, second and third sets of frames, which permits to encode, on the server side, the frames corresponding to the first, second and third sets of frames using the encoding process based on the initial segment size of the content item and the supplemental content item.

In such embodiments, these methods and systems additionally allow for the customization of already-existing content items by seamlessly inserting, a supplemental content item, while keeping these already-existing content items intact and maintaining the encoding process based on the initial segment size of the content item and the supplemental content item, which should raise the interest of various platforms such as social media platforms, OTT media services platforms and gaming platforms in utilizing those methods and systems.

Furthermore, those methods and systems for seamlessly inserting a supplemental content item into a content item allow for seamlessly inserting a supplemental content item into a content item at the client device when the user has just requested a content item for an immediate consumption via streaming or for a later consumption involving the downloading the content item and the supplemental content item.

According to some embodiments, the client device receives a manifest for the supplemental content item. Furthermore, the client device receives the first segment of the content item and the second segment of the content item using addresses provided by the manifest for the content item. Similarly, the client device receives the other segments of the content item. Additionally, the client device receives segments of the supplemental content item using addresses provided by the manifest for the supplemental content item.

The client device is able to parse the content item manifest so as to issue requests (e.g., HTTP GET requests) for content item segments and fetch the content item segments stored on the server whose location is indicated in the manifest or one of the playlists associated with the content item. Similarly, the client device is able to parse the supplemental content item manifest so as to issue requests (e.g., HTTP GET requests) for supplemental content item segments and fetch the supplemental content item segments stored on the server whose location is indicated in the manifest or one of the playlists associated with the supplemental content item.

According to some embodiments, the client device identifies the natural supplemental content insertion point within the first segment or the second segment by at least identifying a portion of the first segment or the second segment, that does not comprise closed captions. The portion of the first segment or the second segment corresponds to a frame and the natural supplemental content insertion point is located in between two consecutive frames. In some approaches, one of the two consecutive frames does not comprise closed captions. In some approaches, both consecutive frames do not comprise closed captions.

According to some embodiments, the client device identifies the natural supplemental content insertion point within the first segment or the second segment by at least identifying a portion of the first segment or the second segment, that is associated with audio data of the content item that do not comprise speech. The portion of the first segment or the second segment corresponds to a frame associated with continuous audio data and the natural supplemental content insertion point is located in between two consecutive frames. In some approaches, audio data associated with one of the two consecutive frames do not comprise speech. In some instances, audio data associated with both consecutive frames do not comprise speech.

According to some embodiments, the client device identifies the natural supplemental content insertion point within the first segment or the second segment by at least identifying a portion of the first segment or the second segment, that does not comprise closed captions and that is associated with audio data of the content item that do not comprise speech. The portion of the first segment or the second segment corresponds to a frame associated with continuous audio data and the natural supplemental content insertion point is located in between two consecutive frames. In some approaches, one of the two consecutive frames do not comprise closed captions and is associated with audio data that do not comprise speech. In some approaches, one of the two consecutive frames do not comprise closed captions and the other one of the two consecutive frames is associated with audio data that do not comprise speech. In some approaches, the two consecutive frames do not comprise closed captions and one of the two consecutive frames is associated with audio data that do not comprise speech. In some approaches, the two consecutive frames are associated with audio data that do not comprise speech and one of the two consecutive frames do not comprise closed captions. In some approaches, the two consecutive frames do not comprise closed captions and are both associated with audio data that do not comprise speech.

According to some embodiments, the client device identifies the natural supplemental content insertion point within the first segment or the second segment by at least identifying a portion of the first segment or the second segment, that is associated with audio data that comprise the beginning of a sentence, music, song or any combination thereof. The portion of the first segment or the second segment corresponds to a frame associated with continuous audio data and the natural supplemental content insertion point is located in between two consecutive frames. In some approaches, one of the two consecutive frames is associated with audio data that comprise the beginning of a sentence, music, song or any combination thereof. Alternatively or additionally, the client device identifies the natural supplemental content insertion point within the first segment or the second segment by at least identifying a portion of first segment or the second segment, which is associated with audio data that comprise the end of a sentence, music, song or any combination thereof. The portion of the first segment or the second segment corresponds to a frame associated with continuous audio data and the natural supplemental content insertion point is located in between two consecutive frames. In some approaches, one of the two consecutive frames is associated with audio data that comprise the end of a sentence, music, song or any combination thereof. Alternatively or additionally, the client device identifies the natural supplemental content insertion point within the first segment or the second segment by at least identifying a portion of the first segment or the second segment, that is associated with audio data that comprise silence. The portion of the first segment or the second segment corresponds to a frame associated with continuous audio data and the natural supplemental content insertion point is located in between two consecutive frames. In some approaches, one of the two consecutive frames is associated with audio data that comprise silence. In some approaches, both consecutive frames is associated with audio data that comprise silence. Alternatively or additionally, the client device identifies the natural supplemental content insertion point within the first segment or the second segment by at least identifying a portion of the first segment or the second segment, which comprise a monochromatic frame (e.g., black frame, white frame). The portion of the first segment or the second segment corresponds to a frame and the natural supplemental content insertion point is located in between two consecutive frames. In some approaches, one of the two consecutive frames comprise a monochromatic frame. In some approaches, both consecutive frames comprise a monochromatic frame.

The client device thus selects a definition for the term 'natural supplemental content insertion point' among a plurality of selectable definitions so as to identify a natural supplemental content insertion point within the first segment or the second segment, that allows for the seamless insertion of the supplemental content item into the content item, resulting in the avoidance of the unnatural interruption of the content item by the supplemental content item and the related rewinding of the content item to a point prior to the unnatural interruption. It is also possible to determine the locations of all possible natural supplemental content insertion points within the first segment and the second segment, depending on the selected definition of the term 'natural supplemental content insertion point', using the aforementioned analytic agent. For a seamless insertion of the supplemental content item into the content item, the client device does not insert the supplemental content item into the content item e.g., during the pronunciation of a word or sentence, during the playing of a music or song, during the display of closed captions or during any combination thereof. Furthermore, for a seamless insertion of the supplemental content item into the content item, the client device inserts the supplemental content item into the content item e.g., right before the beginning of a sentence, music or song, right after the end of a sentence, music or song, right before a monochromatic frame (e.g., black frame, white frame), right after a monochromatic frame (e.g., black frame, white frame), right before a period silence or right after the end of the period of a silence.

According to some embodiments, the client device configures the supplemental content insertion logic to identify the default supplemental content insertion point by setting a value corresponding to a number of segments of a sequence of segments of the content item intended to be played before starting playing segments of the supplemental content item, wherein the first segment is a last segment of the sequence of segments of the content item and the value corresponds to a place of the first segment in the sequence of segments of the content item. In some instances, the value can be e.g., 720, 1440 or 2160 segments (24 frames per second and one segment corresponding to 10 frames), e.g., 900, 1800 or 2700 segments (30 frames per second and one segment corresponding to 10 frames); or 1800, 3600 or 5400 segments (60 frames per second and one segment corresponding to 10 frames). In some approaches, the client device configures the supplemental content insertion logic to set the number of segments of the supplemental content item to be played after playing the set number of segments of the content item: the number of segments of the supplemental content item to be played at the default supplemental content insertion point may be lower or equal to the number of segments constituting the supplemental content item. In some approaches, the client device configures the supplemental content insertion logic to set, for each default supplemental content insertion point, a number of segments of the content item to be played before playing a supplemental content item. In some instances, the value can be every e.g., 720, 1440 or 2160 segments (24 frames per second and one segment corresponding to 10 frames), every e.g., 900, 1800 or 2700 segments (30 frames per second and one segment corresponding to 10 frames); or every 1800, 3600 or 5400 segments (60 frames per second and one segment corresponding to 10 frames).

In some approaches, the client device configures the supplemental content insertion logic to identify the default supplemental content insertion point by setting a time point in a runtime of the content item, wherein an end boundary portion of the first segment corresponds to the time point. In some examples, the client device sets the time point to be e.g., 5, 10 or 15 minutes from the start of the runtime of the content item: when the progression point of the content item reaches the time point, a supplemental content item is seamlessly inserted into the content item. In some approaches, the client device configures the supplemental content insertion logic to set, for each default supplemental content insertion point, a time point in a runtime of the content item. In some examples, the time between any two consecutive time points is identical: for instance, the client device sets the time point for each default supplemental content insertion point such that a supplemental content item is seamlessly inserted every e.g., 5, 10 or 15 minutes of the runtime of the content item. In some examples, the time between any two consecutive time points is different. In some examples, the time between any two consecutive time points of a first subset of two consecutive time points is identical while the time between two consecutive time points of a second subset of two consecutive time points is different.

Hereby, the client device configures the supplemental content insertion logic to set the number of segments of the content item to be played before playing segments of the supplemental content item, which determines the position of the default supplemental content insertion point in between two consecutive segments. It should be noted that selecting a number of segments of the content item to be played before playing the supplemental content item may correspond to selecting a time point in the runtime of the content item at which to insert a supplemental content item.

According to some embodiments, the client device identifies the natural supplemental content insertion point by at least identifying a plurality of natural supplemental content insertion points within any one of the first segment and the second segment. The client device then identifies the natural supplemental content insertion point by at least selecting a closest natural supplemental content insertion point from the plurality of natural supplemental content insertion points.

Selecting the closest natural supplemental content insertion point (present in one of the first segment of the content item and the second segment of the content item) to the default supplemental content insertion point allows for the highest possible compliance with the supplemental content insertion logic while avoiding the unnatural interruption of the content item by the supplemental content item and the resulting rewinding of the content item to a point prior to the unnatural interruption.

According to some embodiments, the client device overrides insertion of the supplemental content item at the default supplemental content insertion point when the default supplemental content insertion point is not a natural supplemental content insertion point.

According to some embodiments, the client device overrides insertion of the supplemental content item at the default supplemental content insertion point in response to having the default supplemental content insertion point placed in between a boundary portion of the first segment and a boundary portion of the second segment, both the boundary portion of the first segment and the boundary portion of the second segment comprising closed captions.

According to some embodiments, the client device overrides insertion of the supplemental content item at the default supplemental content insertion point in response to having the default supplemental content insertion point placed in between a boundary portion of the first segment and a boundary portion of the second segment, both the boundary portion of the first segment and the boundary portion of the second segment being associated with audio data comprising speech.

According to some embodiments, the client device overrides insertion of the supplemental content item at the default supplemental content insertion point in response to having the default supplemental content insertion point placed in between a boundary portion of the first segment and a boundary portion of the second segment, both the boundary portion of the first segment and the boundary portion of the second segment comprising closed captions and being associated with audio data comprising speech.

Hereby, if a default supplemental content insertion point (defined by the supplemental content insertion logic) does not qualify as a natural supplemental content insertion point (as described by the selected definition of "natural supplemental content insertion point"), the supplemental content insertion logic is to be overridden to find a natural supplemental content insertion point e.g., the closest natural supplemental content insertion point to the default supplemental content insertion point. Default supplemental content insertion point are located in between two boundary portions of two consecutive segments.

According to some embodiments, the client device plays frames from the buffer by at least sequentially playing, from the buffer, the first set of frames, the second set of frames and the third set of frames. In some approaches, the client device plays the decoded frames from the buffer following the order of arrival of the decoded frames in the buffer when the order of arrival is/first set of frames/second set of frames/third set of frames/. When the order of arrival of the first, second and third sets of decoded frames in the buffer deviates from/first set of frames/second set of frames/third set of frames/ because of a combination of client device parameters and external parameters (both mentioned earlier), the client device maintains the playing order as/first set of frames/ second set of frames/third set of frames/using a buffer manager. In some approaches, the client device uses the buffer manager at all times to maintain the playing order as/first set of frames/second set of frames/third set of frames/ at all times, irrespective of the client device parameters and external parameters and irrespective of the arrival of the first set of frames, second set of frames and third set of frames in the buffer.

Such embodiments allow for seamlessly inserting the supplemental content item into the content item at a natural supplemental content insertion point so as to present, by the client device, the supplemental content item-inserted content item.

According to some embodiments, the client device sequentially plays, from the buffer, the first set of frames, the second set of frames and the third set of frames by at least playing audio data associated with the first set of frames while playing the first set of frames, audio data associated with the second set of frames while playing the second set of frames and audio data associated with the third set of frames while playing the third set of frames.

Therefore, the client device simultaneously plays each frame and the audio data associated with each frame in order for the user to simultaneously consume visual data (e.g., frames) and audio data (e.g., sound, music, speech) associated with the visual data.

According to some embodiments, the client device decodes the first set of frames by at least decoding the first set of frames using a first decoder. Additionally, the client device decodes the second set of frames by at least decoding the second set of frames using a second decoder. Furthermore, the client device decodes the third set of frames by at least decoding the third set of frames using the first decoder;

the first decoder and second decoder being operated simultaneously by the client device.

In this way, the client device is to use a single decoder (e.g., first decoder or second decoder) to decode the encoded frames of a single content item (e.g., the content item or the supplemental content item), which allows for speeding up the decoding process compared to the case where a single decoder is to decode the encoded frames of both the content item and the supplemental content item.

Methods and systems are provided herein for seamlessly inserting, in some embodiments implemented by a server (e.g., a remote server or a local server), a supplemental content item into a content item. In some examples, non-transitory computer-readable instructions encoded on a non-transitory computer-readable medium and executed by control circuitry of the server seamlessly insert a supplemental content item into a content item.

In some approaches, the server analyzes a subset of segments of a content item to identify a plurality of natural supplemental content insertion points, wherein the plurality of natural supplemental content insertion points comprises a natural supplemental content insertion point within a first segment of the content item or a second segment of the content item. The first segment and the second segment are any consecutive segments of the content item. The natural supplemental content insertion point is, for instance, a point in between two consecutive portions of the first segment (i.e., within the first segment) or two consecutive portions of the second segment (i.e. within the second segment), at which the insertion of a supplemental content item does not cause unnatural interruption of the content item by the supplemental content item. The natural supplemental content insertion point is, for instance, a point in between two consecutive segments i.e. in between the first segment and the second segment or more precisely in between a boundary portion of the first segment and a boundary portion of the second segment) at which the insertion of a supplemental content item does not cause unnatural interruption of the content item by the supplemental content item. Natural supplemental content insertion points are more preferentially distributed within a segment than in between two consecutive segments. If there is no natural supplemental content insertion points in between the first segment and the second segment, within the first segment or within the second segment, the server analyzes other segments of the content item such as a third segment and a fourth segment, wherein the third segment is consecutive to the first segment and spaced apart from the default supplemental content insertion point by the first segment; and wherein the fourth segment is consecutive to the second segment and spaced apart from the default supplemental content insertion point by the second segment. The server continues to analyze segments until at least one natural supplemental content insertion point is found. . . . In some examples, the server uses a default supplemental content insertion logic to identify a default supplemental content insertion point located in between the first segment and the second segment. The default supplemental content insertion logic sets a value corresponding to a number of segments of a sequence of segments of the content item intended to be played before starting playing segments of the supplemental content item wherein the first segment is a last segment of the sequence of segments of the content item and the value corresponds to a place of the first segment in the sequence of segments of the content item. In some instances, the value can be every e.g., 720, 1440 or 2160 segments (24 frames per second and one segment corresponding to 10 frames), every e.g., 900, 1800 or 2700 segments (30 frames per second and one segment corresponding to 10 frames); or every 1800, 3600 or 5400 segments (60 frames per second and one segment corresponding to 10 frames). Non-transitory computer-readable instructions encoded on a non-transitory computer-readable medium and executed by control circuitry of the server comprise the default supplemental content insertion logic. In some examples, non-transitory computer-readable instructions encoded on a non-transitory computer-readable medium and executed by control circuitry of the server comprise instructions to control an analytic agent that identifies a natural supplemental content insertion point within the first segment or the second segment. In some instances, the instructions to control the analytic agent comprises a machine learning model, which distinguishes words of various languages from encoded audio data and closed captions from encoded frames and can identify the beginning and end of sentences, songs and music and monochromatic frames. A natural supplemental content insertion point can be defined according to different selectable definitions, as previously mentioned above.

In some approaches, the server analyzes a subset of segments of a content item to identify a plurality of natural supplemental content insertion points, wherein the plurality of natural supplemental content insertion points comprises a natural supplemental content insertion point within a first segment of the content item or a second segment of the content item. The first segment and the second segment are any consecutive segments of the content item. The natural supplemental content insertion point is, for instance, a point in between two consecutive portions of the first segment (i.e., within the first segment) or two consecutive portions of the second segment (i.e. within the second segment), at which the insertion of a supplemental content item does not cause unnatural interruption of the content item by the supplemental content item. The natural supplemental content insertion point is, for instance, a point in between two consecutive segments i.e. in between the first segment and the second segment or more precisely in between a boundary portion of the first segment and a boundary portion of the second segment) at which the insertion of a supplemental content item does not cause unnatural interruption of the content item by the supplemental content item. Natural supplemental content insertion points are more preferentially distributed within a segment than in between two consecutive segments. If there is no natural supplemental content insertion points in between the first segment and the second segment, within the first segment or within the second segment, the server analyzes other segments of the content item such as a third segment and a fourth segment, wherein the third segment is consecutive to the first segment and spaced apart from the default supplemental content insertion point by the first segment; and wherein the fourth segment is consecutive to the second segment and spaced apart from the default supplemental content insertion point by the second segment. The server continues to analyze segments until at least one natural supplemental content insertion point is found. In some examples, the server uses a default supplemental content insertion logic to identify a default supplemental content insertion point located in between the first segment and the second segment, wherein the default supplemental content insertion point corresponds to a time point in a runtime of the content item. In some instances, the time point can be every e.g., 5, 10 or 15 minutes of the runtime of the content item. In some examples, non-transitory computer-readable instructions encoded on a non-transitory computer-readable medium and executed by control circuitry of the server comprise the default supplemental content insertion logic. In some examples, non-transitory computer-readable instructions encoded on a non-transitory computer-readable medium and executed by control circuitry of the server comprise instructions to control an analytic agent that identifies a natural supplemental content insertion point within the first segment or the second segment. In some instances, the instructions to control the analytic agent comprises a machine learning model, which distinguishes words of various languages from encoded audio data and closed captions from encoded frames and can identify the beginning and end of sentences, songs and music and monochromatic frames. A natural supplemental content insertion point can be defined according to different selectable definitions as, previously mentioned above.

In some approaches, the server analyzes all segments of a content item to identify a plurality of natural supplemental content insertion points, wherein the plurality of natural supplemental content insertion points comprises a natural supplemental content insertion point within a first segment of the content item or a second segment of the content item. The first segment and the second segment are any consecutive segments of the content item. The natural supplemental content insertion point is, for instance, a point in between two consecutive portions of the first segment (i.e., within the first segment) or two consecutive portions of the second segment (i.e. within the second segment), at which the insertion of a supplemental content item does not cause unnatural interruption of the content item by the supplemental content item. The natural supplemental content insertion point is, for instance, a point in between two consecutive segments i.e. in between the first segment and the second segment or more precisely in between a boundary portion of the first segment and a boundary portion of the second segment) at which the insertion of a supplemental content item does not cause unnatural interruption of the content item by the supplemental content item. Natural supplemental content insertion points are more preferentially distributed within a segment than in between two consecutive segments. If there is no natural supplemental content insertion points in between the first segment and the second segment, within the first segment or within the second segment, the client device analyzes other segments of the content item such as a third segment and a fourth segment, wherein the third segment is consecutive to the first segment and spaced apart from the default supplemental content insertion point by the first segment; and wherein the fourth segment is consecutive to the second segment and spaced apart from the default supplemental content insertion point by the second segment.

The server continues to analyze segments until at least one natural supplemental content insertion point is found. In some examples, non-transitory computer-readable instructions encoded on a non-transitory computer-readable medium and executed by control circuitry of the server comprise instructions to control an analytic agent that identifies a natural supplemental content insertion point within the first segment or the second segment. In some instances, the instructions to control the analytic agent comprises a machine learning model, which distinguishes words of various languages from encoded audio data and closed captions from encoded frames and can identify the beginning and end of sentences, songs and music and monochromatic frames. A natural supplemental content insertion point can be defined according to different selectable definitions, as previously mentioned above.

In some approaches, the server creates a manifest for the content item indicating the natural supplemental content insertion point. Besides information (e.g., position along the runtime of the content item, position along the sequence of frames of the content item) about the natural supplemental content insertion point, the manifest for the content item contains information about the plurality of segments constituting the content item (e.g., number of segments, size, length expressed as a duration, available bit rates/resolutions, URL address of the audio and/or video segments, etc.) In some examples, the server creates a manifest for the content item indicating at least the natural supplemental content insertion point. Besides information (e.g., position along the runtime of the content item, position along the sequence of frames of the content item) about at least the natural supplemental content insertion point, the manifest for the content item contains information about the plurality of segments constituting the content item (e.g., number of segments, size, length expressed as a duration, available bit rates/resolutions, URL address of the audio and/or video segments, etc.). In some examples, the server creates a manifest for the content item indicating all the natural supplemental content insertion points. Besides information (e.g., position along the runtime of the content item, position along the sequence of frames of the content item) about all the natural supplemental content insertion points, the manifest for the content item contains information about the plurality of segments constituting the content item (e.g., number of segments, size, length expressed as a duration, available bit rates/resolutions, URL address of the audio and/or video segments, etc.). In some examples, the manifest for the content item can contain information about the plurality of segments constituting a supplemental content item (e.g., number of segments, size, length expressed as a duration, available bit rates/resolutions, URL address of the audio and/or video segments, etc.) to be seamlessly inserted into the content item.

In some approaches, the server modifies the manifest file of the content item by adding an attribute that signals to the client device that a default supplemental content insertion point can be overridden. The attribute such as "Supplemental Content_Early" can be associated with a value that references the default supplemental content insertion point. For example, a value of '3' might indicate that the natural supplemental content insertion point for a specific default supplemental content insertion point maybe 3 seconds earlier than the default time corresponding to the default supplemental content insertion point.

In some approaches, the server and a client device are connected via a communication network (e.g., LAN or WAN). The server receives a request, from a client device, for the content item via the communication network. The server sends the manifest for the content item to the client device. In some examples, the server sends the manifest for the content item and a manifest for a supplemental content item to the client device. The manifest for the supplemental content item contains information about the plurality of segments constituting the supplemental content item (e.g., number of segments, size, length expressed as a duration, available bit rates/resolutions, URL address of the audio and/or video segments, etc.). In some examples, the supplemental content item does not contain segments and is simply e.g., a .mp4 file that can be e.g., a 15-seconds long file. In some instances, the supplemental content item comprises a pod of 4 different supplemental content sub-items, wherein each supplemental content sub-item is e.g., a 15-seconds .mp4 file.

In some approaches, by sending the manifest for the content item to the client device, the server causes the client device to perform a plurality of actions e.g., decode a first set of frames of the content item up to the natural supplemental content insertion point, place the first set of frames into a buffer, decode a second set of frames of the supplemental content item, place the second set of frames into the buffer, decode a third set of frames of the content item from the natural supplemental content insertion point, place the third set of frames into the buffer, or any combination thereof. In some examples, the client device decodes the first set of frames, the second set of frames and the third set of frames using a single decoder. Alternatively, the client device decodes the first set of frames of the content item and the third set of frames of the content item using a first decoder while the client device decodes the second set of frames of the supplemental content item using a second decoder.

In some approaches, by sending the manifest for the content item to the client device, the server causes the client device to play frames from the buffer. In some examples, the client device plays the decoded frames following the order of arrival of the decoded frames in the buffer e.g., when the order of arrival of the decoded frames in the buffer is/first set of frames/second set of frames/third set of frames/so as to play the supplemental content item-inserted content item. Alternatively, the client device plays the decoded frames following an order established by a buffer manager, e.g., when the order of playing is to be kept as/first set of frames/second set of frames/third set of frames/at all times (so as to play the supplemental content item-inserted content item) or when the order of arrival of the decoded frames in the buffer deviates from/first set of frames/second set of frames/third set of frames/(corresponding to the playing of the supplemental content item-inserted content item) because of a combination of client device parameters (e.g., type of codec used for encoding and decoding, number of decoders employed, times at which each decoder starts to operate) and external parameters (e.g., available bandwidth of the communication network connecting the client device to the server, data quantity contained in each segment corresponding to the first, second and third sets of frames). In some examples, the client device plays the frames while populating the buffer. Alternatively, the client device plays the frames after having populated the buffer. In some instances, non-transitory computer-readable instructions encoded on a non-transitory computer-readable medium and executed by control circuitry of the client device comprise instructions controlling the buffer manager.

In such embodiments, these methods and systems allow to conduct, on the server side, the analysis of the first segment and the second segment to identify the location of e.g., the natural supplemental content insertion point, at least the natural supplemental content insertion point or all natural supplemental content insertion points, well in advance of the detection, by the user device, of a request for consuming a content item; whereas the seamless insertion of the supplemental content item within a content item segment remains a task performed by the client device, avoiding the unnatural interruption of the content item by the supplemental content item and the associated need for rewinding the content item to a point prior to the unnatural interruption. The workload is thus shared between the server and the client device and the seamless insertion of the supplemental content item into the content item is to be effected faster as the analysis of the content item segments is done before the user device detects a request for the consumption of the content item. Furthermore, these methods and systems avoid the re-encoding of the content item and the supplemental content item that should normally result from the decrease of the size of the content item segments and supplemental content item segments due to the insertion of the supplemental content item, by the client device, within a content item segment. In effect, the client device inserts the supplemental content item into the content item after having decoded the first, second and third sets of frames, which permits to encode, on the server side, the frames corresponding to the first, second and third sets of frames using the encoding process based on the initial segment size of the content item and the supplemental content item.

In such embodiments, these methods and systems additionally allow for the customization of already-existing content items by seamlessly inserting, a supplemental content item, while keeping these already-existing content items intact and maintaining the encoding process based on the initial segment size of the content item and the supplemental content item, which should raise the interest of various platforms such as social media platforms, OTT media services platforms and gaming platforms in utilizing those methods and systems.

Furthermore, those methods and systems for seamlessly inserting a supplemental content item into a content item allow for seamlessly inserting a supplemental content item into a content item at the client device when the user has just requested a content item for an immediate consumption via streaming or for a later consumption involving the downloading the content item and the supplemental content.

Methods and systems are provided herein for seamlessly inserting, in some embodiments by a server (e.g., a remote server or a local server), a supplemental content item into a content item. In some examples, non-transitory computer-readable instructions encoded on a non-transitory computer-readable medium and executed by control circuitry of the server seamlessly insert a supplemental content item into a content item.

In some approaches, the server and a client device are connected via a communication network (e.g., LAN or WAN). The server receives a request, from the client device, for a content item via the communication network. The server sends a manifest for the content item to the client device via the communication network. The manifest for the content item contains information about the plurality of segments constituting the content item (e.g., number of segments, size, length expressed as a duration, available bit rates/resolutions, URL address of the audio and/or video segments, etc.). In some examples, the manifest for the content item can contain information about the plurality of segments constituting a supplemental content item (e.g., number of segments, size, length expressed as a duration, available bit rates/resolutions, URL address of the audio and/or video segments, etc.) to be seamlessly inserted into the content item. In some examples, the server sends the manifest for the content item and a manifest for a supplemental content item to the client device via the communication network. The manifest for the supplemental content item contains information about the plurality of segments constituting the supplemental content item (e.g., number of segments, size, length expressed as a duration, available bit rates/resolutions, URL address of the audio and/or video segments, etc.). In some examples, the supplemental content item does not contain segments and is simply e.g., a .mp4 file that can be e.g., a 15-seconds long file. In some instances, the supplemental content item comprises a pod of 4 different supplemental content sub-items, wherein each supplemental content sub-item is e.g., a 15-seconds .mp4 file.

In some approaches, the server accesses a supplemental content insertion logic to identify a default supplemental content insertion point between a first segment of the content item and a second segment of the content item, wherein the first segment and second segment are two consecutive segments. In some examples, the first segment of the content item and the second segment of the content item are any two consecutive segments of the sequence of segments of the content item corresponding to the entire runtime of the content item. In some examples, non-transitory computer-readable instructions encoded on a non-transitory computer-readable medium and executed by control circuitry of the client device comprise the supplemental content insertion logic. In some examples, the server configures the supplemental content insertion logic to identify the default supplemental content insertion point by setting a value corresponding to a number of segments of a sequence of segments of the content item intended to be played before starting playing segments of the supplemental content item, wherein the first segment is a last segment of the sequence of segments of the content item and the value corresponds to a place of the first segment in the sequence of segments of the content item. In some instances, the value can be e.g., 720, 1440 or 2160 segments (24 frames per second and one segment corresponding to 10 frames), e.g., 900, 1800 or 2700 segments (30 frames per second and one segment corresponding to 10 frames); or 1800, 3600 or 5400 segments (60 frames per second and one segment corresponding to 10 frames). In some examples, the server configures the supplemental content insertion logic to set the number of segments of the supplemental content item to be played after playing the set number of segments of the content item: the number of segments of the supplemental content item to be played at the default supplemental content insertion point may be lower or equal to the number of segments constituting the supplemental content item. In some examples, the server configures the supplemental content insertion logic to set, for each default supplemental content insertion point, a number of segments of the content item to be played before playing a supplemental content item. In some instances, the value can be every e.g., 720, 1440 or 2160 segments (24 frames per second and one segment corresponding to 10 frames), every e.g., 900, 1800 or 2700 segments (30 frames per second and one segment corresponding to 10 frames); or every 1800, 3600 or 5400 segments (60 frames per second and one segment corresponding to 10 frames).

In some examples, the server configures the supplemental content insertion logic to identify the default supplemental content insertion point by setting a time point in a runtime of the content item, wherein an end boundary portion of the first segment corresponds to the time point. In some examples, the server sets the time point to be e.g, 5, 10 or 15 minutes from the start of the runtime of the content item: when the progression point of the content item reaches the time point, a supplemental content item is seamlessly inserted into the content item. In some examples, the server configures the supplemental content insertion logic to set, for each default supplemental content insertion point, a time point in a runtime of the content item. In some examples, the time between any two consecutive time points is identical: for instance, the server sets the time point for each default supplemental content insertion point such that a supplemental content item is seamlessly inserted every e.g., 5, 10 or 15 minutes of the runtime of the content item. In some examples, the time between any two consecutive time points is different. In some examples, the time between any two consecutive time points of a first subset of two consecutive time points is identical while the time between two consecutive time points of a second subset of two consecutive time points is different.

In some approaches, the server analyzes the first segment of the content item and the second segment of the content item to identify a natural supplemental content insertion point. The natural supplemental content insertion point is, for instance, a point in between two consecutive portions of the first segment (i.e., within the first segment) or two consecutive portions of the second segment (i.e. within the second segment), at which the insertion of a supplemental content item does not cause unnatural interruption of the content item by the supplemental content item. The natural supplemental content insertion point is, for instance, a point in between two consecutive segments i.e. in between the first segment and the second segment or more precisely in between a boundary portion of the first segment and a boundary portion of the second segment) at which the insertion of a supplemental content item does not cause unnatural interruption of the content item by the supplemental content item. Natural supplemental content insertion points are more preferentially distributed within a segment than in between two consecutive segments. If there is no natural supplemental content insertion points in between the first segment and the second segment, within the first segment or within the second segment, the client device analyzes other segments of the content item such as a third segment and a fourth segment, wherein the third segment is consecutive to the first segment and spaced apart from the default supplemental content insertion point by the first segment; and wherein the fourth segment is consecutive to the second segment and spaced apart from the default supplemental content insertion point by the second segment. The server continues to analyze segments until at least one natural supplemental content insertion point is found. In some examples, non-transitory computer-readable instructions encoded on a non-transitory computer-readable medium and executed by control circuitry of the server comprise instructions to control the analytic agent that identifies a natural supplemental content insertion point within the first segment or the second segment. In some instances, the instructions to control the analytic agent comprises a machine learning model, which distinguishes words of various languages from encoded audio data and closed captions from encoded frames and can identify the beginning and end of sentences, songs and music and monochromatic frames.

The server transmits, via the communication network, a modified manifest for the content item indicating the natural supplemental content insertion point e.g., as an absolute time stamp or as an offset to the default supplemental content insertion point, in the first segment of the content item or the second segment of the content item, to the client device.

In some approaches, by transmitting the manifest for the content item to the client device, the server causes the client device to perform a plurality of actions e.g., override insertion of the supplemental content item at the default supplemental content insertion point, decode a first set of frames of the content item up to the natural supplemental content insertion point, place the first set of frames into a buffer decode a second set of frames of the supplemental content item, place the second set of frames into the buffer, decode a third set of frames of the content item from the natural supplemental content insertion point, place the third set of frames into the buffer or any combination thereof. In some examples, the client device decodes the first set of frames, the second set of frames and the third set of frames using a single decoder. Alternatively, the client device decodes the first set of frames of the content item and the third set of frames of the content item using a first decoder while the client device decodes the second set of frames of the supplemental content item using a second decoder.

In some approaches, by transmitting the manifest for the content item to the client device, the server causes the client device to play frames from the buffer. In some examples, the client device plays the decoded frames following the order of arrival of the decoded frames in the buffer e.g., when the order of arrival of the decoded frames in the buffer is/first set of frames/second set of frames/third set of frames/so as to play the supplemental content item-inserted content item. Alternatively, the client device plays the decoded frames following an order established by a buffer manager, e.g., when the order of playing is to be kept as/first set of frames/second set of frames/third set of frames/at all times (so as to play the supplemental content item-inserted content item) or when the order of arrival of the decoded frames in the buffer deviates from/first set of frames/second set of frames/third set of frames/(corresponding to the playing of the supplemental content item-inserted content item) because of a combination of client device parameters (e.g., type of codec used for encoding and decoding, number of decoders employed, times at which each decoder starts to operate) and external parameters (e.g., available bandwidth of the communication network connecting the client device to the server, data quantity contained in each segment corresponding to the first, second and third sets of frames). In some examples, the client device plays the frames while populating the buffer. Alternatively, the client device plays the frames after having populated the buffer. In some instances, non-transitory computer-readable instructions encoded on a non-transitory computer-readable medium and executed by control circuitry of the client device comprise instructions controlling the buffer manager.

In such embodiments, these methods and systems allow to conduct, on the server side, the analysis of the first segment and the second segment to identify a natural supplemental content insertion point within the first segment or the second segment after the user device has detected a request for consuming a content item; whereas the seamless insertion of the supplemental content item within a content item segment remains a task performed by the client device, avoiding the unnatural interruption of the content item by the supplemental content item and the associated need for rewinding the content item to a point prior to the unnatural interruption. The workload is thus shared between the server and the client device. Furthermore, these methods and systems also avoid the re-encoding of the content item and the supplemental content item that should normally result from the decrease of the size of the content item segments and supplemental content item segments due to the insertion of the supplemental content item, by the client device, within the content item segment. In effect, the client device inserts the supplemental content item into the content item after having decoded the first, second and third sets of frames, which permits to encode, on the server side, the frames corresponding to the first, second and third sets of frames using the encoding process based on the initial segment size of the content item and the supplemental content item.

In such embodiments, these methods and systems additionally allow for the customization of already-existing content items by seamlessly inserting, a supplemental content item, while keeping these already-existing content items intact and maintaining the encoding process based on the initial segment size of the content item and the supplemental content item, which should raise the interest of various platforms such as social media platforms, OTT media services platforms and gaming platforms in utilizing those methods and systems.

Furthermore, those methods and systems for seamlessly inserting a supplemental content item into a content item allow for seamlessly inserting a supplemental content item into a content item at the client device when the user has just requested a content item for an immediate consumption via streaming or for a later consumption involving the downloading the content item and the supplemental content.

BRIEF DESCRIPTION OF THE DRAWINGS

FIG. 7 depicts a flowchart describing an example for seamlessly inserting, by a client device, a supplemental content item into a content item in accordance with some implementations of the disclosure;

FIG. 8 shows a flowchart describing an example for seamlessly inserting, by a server, a supplemental content item into a content item in accordance with some implementations of the disclosure;

DETAILED DESCRIPTION

Figure 1:
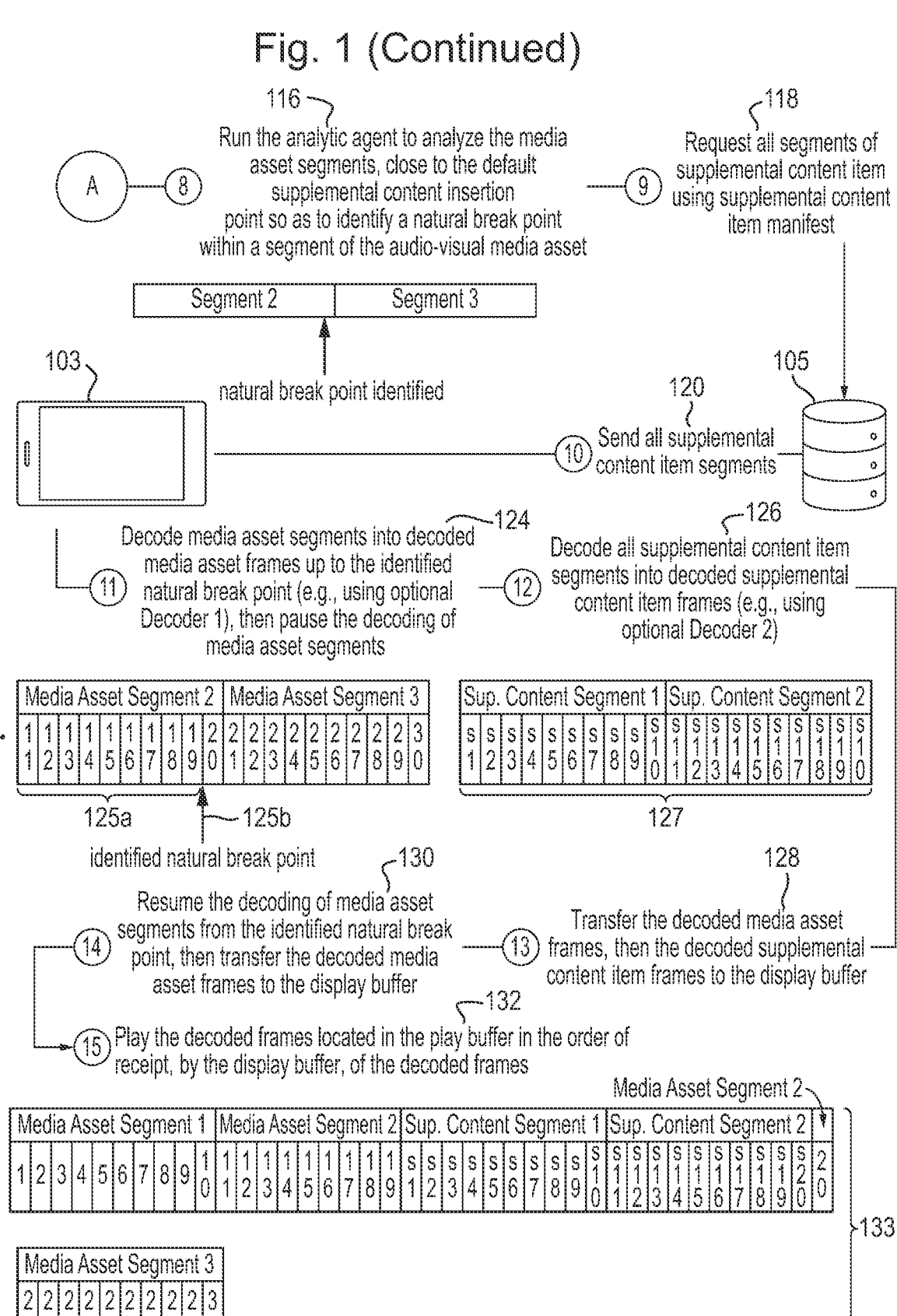
FIG. 1 represents the steps of an example for seamlessly inserting, by a user device, a supplemental content item into an audio-visual media asset in accordance with some implementations of the disclosure.

As referred to herein, the terms "content item" and "media asset" should be understood to mean an electronically consumable user asset, such as an electronic version of a printed book, electronic television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, articles, newspapers, blogs, advertisements, chat sessions, social media, applications, games, and/or any other media or multimedia and/or combination of the same.

As referred herein, the term "supplemental content item" should be understood to mean a content item (or media asset) that is to be inserted into another content item (or media asset). In some examples, the supplemental content item comprises content related the to-be-consumed content item (e.g., highlights of a previous episode of a TV series to understand a scene of the to-be-consumed episode, deleted portions of the to-be-consumed content item due to censorship or resulting from cut performed by e.g., movie directors or movie studios). In some examples, the supplemental content item comprises content unrelated to the to-be-consumed content item (e.g., advertisements). In some examples, the supplemental content item comprises content unrelated to the to-be-consumed content item but related to an event concomitant with the consumption of the to-be-consumed content item (e.g., breaking news, sport events). In some instances, non-transitory computer-readable instructions encoded on a non-transitory computer-readable medium and executed by control circuitry of the client device or control circuitry of the server select the supplemental content item based on user profiles, in which information (e.g., demographics, interests, socioeconomic status, internet search history, content item search history, content item consumption history) are stored.

As referred herein, the term "user device" should be understood to mean a device configured to play a content item, such as a mobile phone, a tablet, a computer, a television and the likes. The user device is connected to a server (e.g., local or remote server) via a communication network (e.g., LAN or WAN).

As referred herein, the term "natural break point" should be understood to mean a point in between two consecutive portions of a single segment or in between two consecutive boundary portions (in this case, each portion belonging to a different segment and the two different segments being consecutive segments) at which a supplemental content item can be seamlessly inserted into a content item without causing an unnatural interruption of the content item. Each of the two portions of the single segment corresponds to a frame and each of the two boundary portions of the two consecutive segments corresponds to a frame.

For a seamless insertion of the supplemental content item into the content item, the client device does not insert the supplemental content item into the content item e.g., during the pronunciation of a word or sentence, during the playing of a music or song, during the display of closed captions or during any combination thereof. Furthermore, for a seamless insertion of the supplemental content item into the content item, the client device inserts the supplemental content item into the content item e.g., right before the beginning of a sentence, music or song, right after the end of a sentence, music or song, right before a monochromatic frame (e.g. black frame, white frame), right after a monochromatic frame (e.g., black frame, white frame), right before a period silence or right after the end of the period of a silence. There are thus several definitions for the term 'natural break point'. Some definitions are listed below and can be applied in the examples depicted in FIG. 1, 3-9.

In some examples, the user device (or the server) identifies the natural break point within one of two consecutive segments by at least identifying a portion of one of the two consecutive segments, that does not comprise closed captions. The portion of one of the two consecutive segments corresponds to a frame and the natural break point is located in between two consecutive frames. In some approaches, one of the two consecutive frames does not comprise closed captions. In some approaches, both consecutive frames do not comprise closed captions.

In some instances, the user device (or the server) identifies the natural break point within one of two consecutive segments by at least identifying a portion of one of the two consecutive segments, that is associated with audio data of the content item that do not comprise speech. The portion of one of the two consecutive segments corresponds to a frame associated with continuous audio data of the content item and the natural break point is located in between two consecutive frames. In some approaches, audio data of the content item associated with one of the two consecutive frames do not comprise speech. In some instances, audio data of the content item associated with both consecutive frames do not comprise speech.

In some examples, the user device (or the server) identifies the natural break point within one of the two consecutive segments by at least identifying a portion of one of two consecutive segments, which does not comprise closed captions and that is associated with audio data of the content item that do not comprise speech. The portion of one of the two consecutive segments corresponds to a frame associated with continuous audio data of the content item and the natural break point is located in between two consecutive frames. In some instances, one of the two consecutive frames do not comprise closed captions and is associated with audio data of the content item that do not comprise speech. In some examples, one of the two consecutive frames do not comprise closed captions and the other one of the two consecutive frames is associated with audio data of the content item that do not comprise speech. In some examples, the two consecutive frames do not comprise closed captions and one of the two consecutive frames is associated with audio data of the content item that do not comprise speech. In some instances, the two consecutive frames are associated with audio data of the content item that do not comprise speech and one of the two consecutive frames do not comprise closed captions. In some instances, the two consecutive frames do not comprise closed captions and are associated with audio data of the content item that do not comprise speech.

In some instances, the user device (or the server) identifies the natural break point within one of two consecutive segments by at least identifying a portion of one of the two consecutive segments, that is associated with audio data of the content item that comprise the beginning of a sentence, music, song or any combination thereof. The portion of one of the two consecutive segments corresponds to a frame associated with continuous audio data of the content item and the natural break point is located in between two consecutive frames. Alternatively or additionally, the user device (or the server) identifies the natural break point within one of two consecutive segments by at least identifying a portion of one of the two consecutive segments, that is associated with audio data of the content item that comprise the end of a sentence, music, song or any combination thereof. The portion of one of the two consecutive segments corresponds to a frame associated with continuous audio data and the natural break point is located in between two consecutive frames. Alternatively or additionally, the user device (or the server) identifies the natural break point within one of two consecutive segments by at least identifying a portion of one of the two consecutive segments, that is associated with audio data of the content item that comprise silence. The portion of one of the two consecutive segments corresponds to a frame associated with continuous audio data of the content item and the natural break point is located in between two consecutive frames. Alternatively or additionally, the user device (or the server) identifies the natural break point within one of two consecutive segments by at least identifying a portion of one of the two consecutive segments, that comprise a monochromatic frame (e.g., black frame, white frame). The portion of one of the two consecutive segments corresponds to a frame and the natural break point is located in between two consecutive frames.

As referred herein, the term "closed captions" should be understood to mean words shown e.g., at the bottom or other locations wherever appropriate, of a display of a user device. In some examples, these words correspond to what is being said (e.g., literally or approximatively). In some instances, these words correspond to a translation (e.g., literal translation, approximative translation) of what is being said. In some examples, closed captions may provide additional details to describe a scene without involving any transcription of pronounced words or sentences or translation of the pronounced words or sentences (such as "birds chirping", "wind gusting", "individual approaching"). In this respect, natural break points can be defined by selecting a given type of closed captions.

FIG. 1 represents the steps of an example 100 for seamlessly inserting, by a user device 103, a supplemental content item into an audio-visual media asset in accordance with some implementations of the disclosure. In some examples, non-transitory computer-readable instructions encoded on a non-transitory computer-readable medium and executed by control circuitry of client device 103 seamlessly insert a supplemental content item into an audio-visual media asset. User device 103 comprises any device configured to play a content item, such as a mobile phone, a tablet, a computer, a television and the likes. User device 103 is connected to a server 105 via a communication network (not shown on FIG. 1).

In some embodiments, at step 102, user device 103 detects a request, by a user, for consuming an audio-visual media asset (e.g., Game of Thrones) via a user input implemented via a user interface of user device 103 (e.g., a mouse, a remote control, a tactile screen). In some embodiments, at step 102, user device 103 also initializes a buffer (e.g., a play buffer or a display buffer) to store decoded segments of the audio-visual media asset and the supplemental content item.

In some implementations, at step 104, user device 103 sends a request for the audio-visual media asset to server 105 via the communication network.

In some embodiments, at step 106, server 105 sends both the manifest 107a of the audio-visual media asset and the manifest 107b of the supplemental content item to user device 103 via the communication network. Manifest 107a of the audio-visual media asset lists e.g., the presence of three segments (Media Asset Segment 1, Media Asset Segment 2 and Media Asset Segment 3), the time period (expressed in seconds) corresponding to each segment and the network address corresponding to each segment. Manifest 107b of the supplemental content item lists e.g., the presence of two segments (Supplemental Content Segment 1 and Supplemental Content Segment 2), the time period (expressed in seconds) corresponding to each segment and the network address corresponding to each segment.

In some implementations, at step 108, user device 103 requests, from server 105, audio-visual media segments using manifest 107a via the communication network.

In some embodiments, at step 110, server 105 sends segments of the audio-visual media asset to user device 103 via the communication network.

In some implementations, at step 112, user device 103 plays the audio-visual media asset and accesses the supplemental content insertion logic. The supplemental content insertion logic establishes the rule of inserting the supplemental content item into the audio-visual media asset and thus defines the location of the default supplemental content insertion point. For instance, the supplemental content item is to be inserted every two audio-visual media asset segments, implying that a default supplemental content insertion point is to be located right after two consecutive audio-visual media asset segments. Both the number of audio-visual media asset segments (after which supplemental content item segments are inserted) and the number of supplemental content item segments to be inserted can be set to any figures determined by the supplemental content insertion logic. In some examples, non-transitory computer-readable instructions encoded on a non-transitory computer-readable medium and executed by control circuitry of the client device comprise the supplemental content insertion logic.

In some embodiments, at step 114, the current progression point of the audio-visual media asset (being played) is constantly compared, by user device 103, to the progression point corresponding to the default supplemental content point. If the current progression point and the progression point corresponding to the default supplemental content point are not sufficiently close to each other, steps 108-114 are repeated. If the current progression point and the progression point corresponding to the default supplemental content point are sufficiently close to each other, step 116 is to occur. The expression 'sufficiently close to' refers to the time period (e.g., within 1, 2, 3, 4 or 5 seconds, or within 24, 48, 72, 96 or 120 frames) to reach the progression point corresponding to the default supplemental content point from the current progression point, which must be long enough in order for the user device 103 to identify a natural break point within an audio-visual media asset segment (close to the default supplemental content insertion point) and insert the supplemental content item at the identified natural break point.

In some implementations, at step 116, user device 103 runs an analytic agent (not shown in FIG. 1) to analyze the audio-visual media asset segments, close to the default supplemental content insertion point so as to identify a natural break point within a segment of the audio-visual media asset. In some examples, non-transitory computer-readable instructions encoded on a non-transitory computer-readable medium and executed by control circuitry of client device 103 comprise instructions to control an analytic agent that identifies a natural supplemental content insertion point within the segment of the audio-visual media asset. In some instances, the instructions to control the analytic agent comprises a machine learning model, which distinguishes words of various languages from encoded audio data and closed captions from encoded frames and can identify the beginning and end of sentences, songs and music and monochromatic frames. A natural supplemental content insertion point can be defined according to different selectable definitions, as previously mentioned above.

In some embodiments at step 118, user device 103 requests all supplemental content item segments using the supplemental content item manifest 107*b* via the communication network.

In some implementations, at step 120, server 105 sends all supplemental content item segments to user device 103 via the communication network. (There is no step 122.)

In some implementations, at step 124, user device 103 (e.g., using optional decoder 1—See decoder 504 shown on FIG. 5) decodes Media Asset Segment 1 and the portion 125*a* of the Media Asset Segment 2, in other words up to the identified natural break point 125*b*. Then, user device 103 pauses the decoding of the audio-visual media asset segments, leaving aside leftover portion of Media Asset Segment 2 and Media Asset Segment 3, in order to move the decoded frames to the display buffer. The pausing is optional when one decoder decodes the content item while another decoder decodes the supplemental content item. Each audio-visual media asset segment is made of a set of ten frames. These 10 frames are each associated with audio data of the audio-visual media asset. The numeral reference of each frame of each audio-visual media asset segment depends on the position of the frame in the entire sequence of audio-visual media asset segments. The numeral reference of each frame of each audio-visual media asset segment could be thus e.g., 1, 2, 3, 10, 20, 28, or 30. It should be noted that the numeral references correspond to the display order of the frames, which may differ from the decoding order of the frames from a bitstream. The conversion from decoding order to display order of a frame follows the decoding buffer management specified in common codec standards.

In some embodiments, at step 126, user device 103 (e.g., using optional decoder 2—See decoder 510 shown on FIG. 5) decodes all supplemental content item segments 127. Each supplemental content item segment is made of a set of ten frames. These 10 frames are each associated with audio data of the supplemental content item. The numeral reference of each frame of each supplemental content item segment depends on the position of the frame in the entire sequence of supplemental content item segments. The numeral reference of each frame of each supplemental content item segment could be thus e.g., S1, S2, S3, S10, S20. It should be noted that the numeral references correspond to the display order of the frames, which may differ from the decoding order of the frames from a bitstream. The conversion from decoding order to display order of a frame follows the decoding buffer management specified in common codec standards.

In some implementations, at step 128, user device 103 transfers the decoded frames of the audio-visual media asset, then the decoded frames of the supplemental content item to the display buffer.

In some embodiments, at step 130, user device 103 resumes the decoding of the audio-visual media asset segments from the identified natural break point 125*b* so as to decode frame 20 of Media Asset Segment 2 and Media Asset Segment 3. User device 103 then transfers the decoded media asset frames to the display buffer.

In some implementations, at step 132, user device 103 plays the decoded frames located in the display buffer in the order of receipt, by the display buffer, of the decoded frames i.e., /frames 1 to 19/frames S1 to S20/frames 20 to 30/. The sequence 133 of decoded frames present in the display buffer is to be played. Sequence 133 of decoded frames corresponds to the supplemental content item-inserted audio-visual media asset. Frame 20 of Media Asset Segment 2 is then located in between Frame S20 of Supplemental Content Segment 2 and Frame 21 of Media Asset Segment 3.

In some embodiments, at step 132, a buffer manager (e.g., buffer manager 514 shown in FIG. 5) maintains the playing order of the frames as/frames 1 to19/frames S1 to S20/ frames 20 to 30*l*, irrespective of the order of arrival of these frames in the buffer. In some instances, non-transitory computer-readable instructions encoded on a non-transitory computer-readable medium and executed by control circuitry of the client device 103 comprise instructions controlling the buffer manager.

In some embodiments, several steps of example 100 use hardware and/or software of user device 103. For instance, in some embodiments, step 102 (in which user device 103 detects a request made by a user via a user interface of user device 103) involves various components of user device 103 such as a user interface (e.g., user input interface 226 shown in FIG. 2), control circuitry (e.g., control circuitry 218 shown in FIG. 2), I/O paths (e.g., I/O paths 220 depicted in FIG. 2) and software e.g., system software, utility software, application software. For example, in some implementations, step 108 (in which user device 103 requests media asset segments using the media asset manifest 107*a* from server 105) involves different components of user device 103 such as I/O paths (e.g., I/O paths 220 shown in FIG. 2), control circuitry (e.g., control circuitry 218 shown in FIG. 2) and software e.g., system software, utility software, application software.

Similarly, several steps of example 100 use hardware and/or software of server 105. For instance, in some implementations, step 110 (in which server 105 sends media asset segments to user device 103) involves various components of server 105 such as I/O paths (e.g., I/O paths 212 shown in FIG. 2), control circuitry (e.g., control circuitry 210 shown in FIG. 2) and software e.g., system software, utility software, application software.

Figure 2:
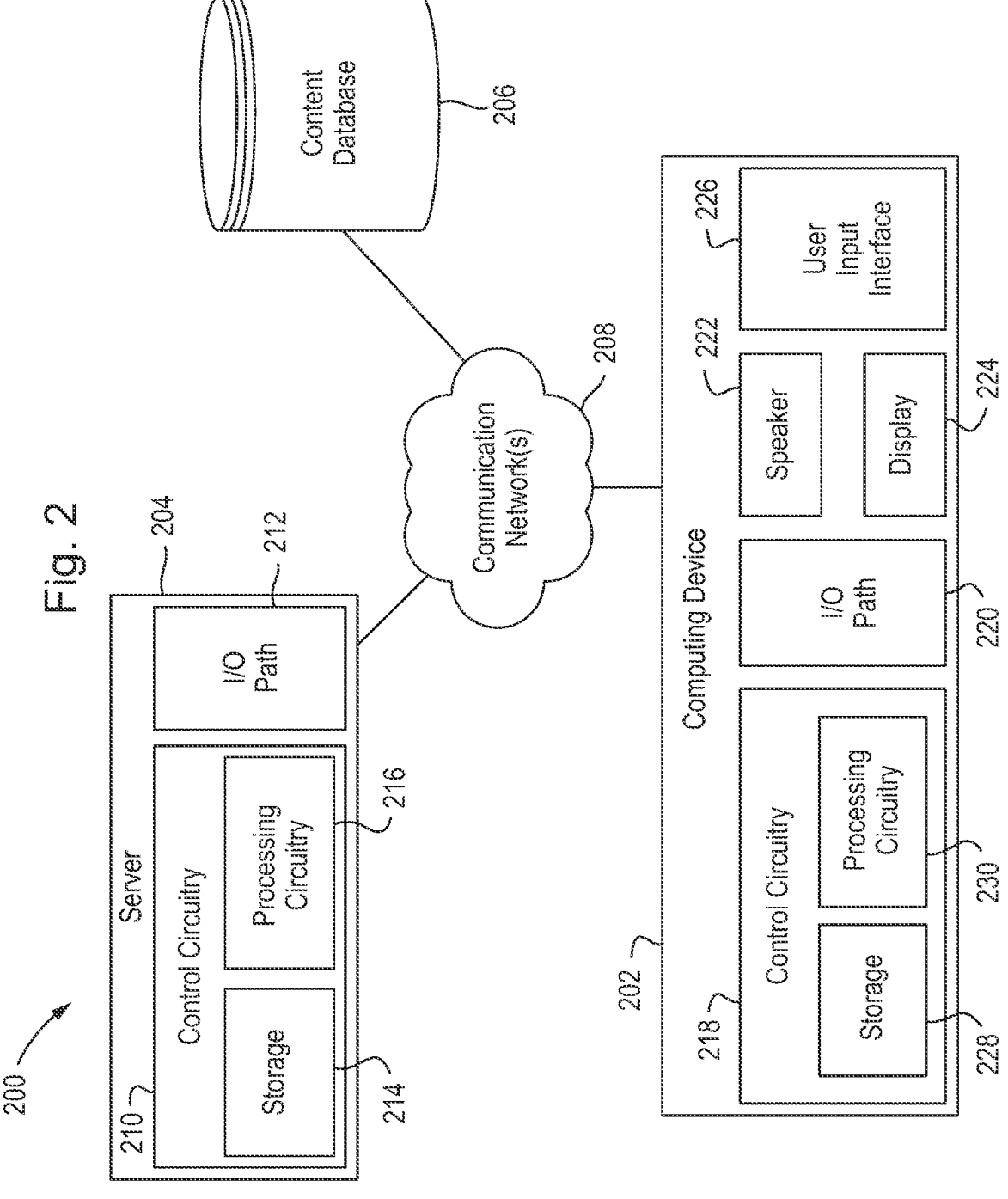
FIG. 2 illustrates a block diagram showing components of an example for seamlessly inserting a supplemental content item into an audio-visual media asset in accordance with some implementations of the disclosure.

FIG. 2 illustrates a block diagram showing components of an example system 200 for seamlessly inserting a supplemental content item into an audio-visual media asset in accordance with some implementations of the disclosure. Although FIG. 2 shows system 200 as including a number and configuration of individual components, in some examples, any number of the components of system 200 is combined and/or integrated as one device, e.g., as user device 103. System 200 includes computing device 202, server 204 (e.g., server 105, server 301, server 405 depicted in FIGS. 1, 3 and 4, respectively), and content database 206, each of which is communicatively coupled to communication network 208, which is the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which can be a personal computer, a laptop computer, a tablet computer, a smartphone, a smart television, a smart speaker, or any other type of computing device, includes control circuitry 218, I/O path 220, speaker 222, display 224, and user input interface 226, which in some examples provides a user selectable option for enabling and disabling the display of modified closed captions. Control circuitry 218 includes storage 228 and processing circuitry 230. Control circuitry 210 and/or 218 is based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and includes a multi-core processor (e.g., dual-core, quad-core, hexa-core, or any suitable number of cores). In some examples, processing circuitry is distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) is an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 2D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 is used to store various types of content, metadata, and or other types of data. Non-volatile memory also is used (e.g., to launch a boot-up routine and other instructions). Cloud-based storage is used to supplement storages 214, 228 or instead of storages 214, 228. In some examples, control circuitry 210 and/or 218 executes instructions for an application stored in memory (e.g., storage 214 and/or 228). Specifically, control circuitry 210 and/or 218 is instructed by the application to perform the functions discussed herein. In some implementations, any action performed by control circuitry 210 and/or 218 is based on instructions received from the application. For example, the application is implemented as software or a set of executable instructions that is stored in storage 214 and/or 228 and executed by control circuitry 210 and/or 218. In some examples, the application is a client/server application where only a client application resides on computing device 202, and a server application resides on server 204.

The application is implemented using any suitable architecture. For example, it is a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 retrieves instructions for the application from storage 228 and process the instructions to perform the functionality described herein. Based on the processed instructions, control circuitry 218 determines what action to perform when input is received from user input interface 226.

In client/server-based examples, control circuitry 218 includes communication circuitry suitable for communicating with an application server (e.g., server 204) or other networks or servers. The instructions for carrying out the functionality described herein are stored on the application server. Communication circuitry includes a cable modem, an Ethernet card, or a wireless modem for communication with other equipment, or any other suitable communication circuitry. Such communication involves the Internet or any other suitable communication networks or paths (e.g., communication network 208). In another example of a client/ server based application, control circuitry 218 runs a web browser that interprets web pages provided by a remote server (e.g., server 204). For example, the remote server stores the instructions for the application in a storage device. The remote server processes the stored instructions using circuitry (e.g., control circuitry 210) and/or generates displays. Computing device 202 receives the displays generated by the remote server and displays the content of the displays locally via display 224. This way, the processing of the instructions is performed remotely (e.g., by server 204) while the resulting displays are provided locally on computing device 202. Computing device 202 receives inputs from the user via input interface 226 and transmits those inputs to the remote server for processing and generating the corresponding displays.

A user sends instructions, e.g., to view an interactive media content item and/or selects one or more programming options of the interactive media content item, to control circuitry 210 and/or 218 using user input interface 226. User input interface 226 is any suitable user interface, such as a remote control, trackball, keypad, keyboard, touchscreen, touchpad, stylus input, joystick, speech recognition interface, gaming controller, or other user input interfaces. User input interface 226 is integrated with or combined with display 224, which can be a monitor, a television, a liquid crystal display (LCD), an electronic ink display, or any other equipment suitable for displaying visual images.

Server 204 and computing device 202 transmits and receives content and data via I/O path 212 and 220, respectively. For instance, I/O path 212 and/or I/O path 220 includes a communication port(s) configured to transmit and/or receive (for instance to and/or from content database 206), via communication network 208, content item identifiers, content metadata, natural language queries, and/or other data. Control circuitry 210, 218 is used to send and receive commands, requests, and other suitable data using I/O paths 212, 220. I/O paths 212 of server 200 and I/O paths 220 of computing device 202 each comprises I/O circuitry e.g., network interface, port, bus, wire.

Figure 3:
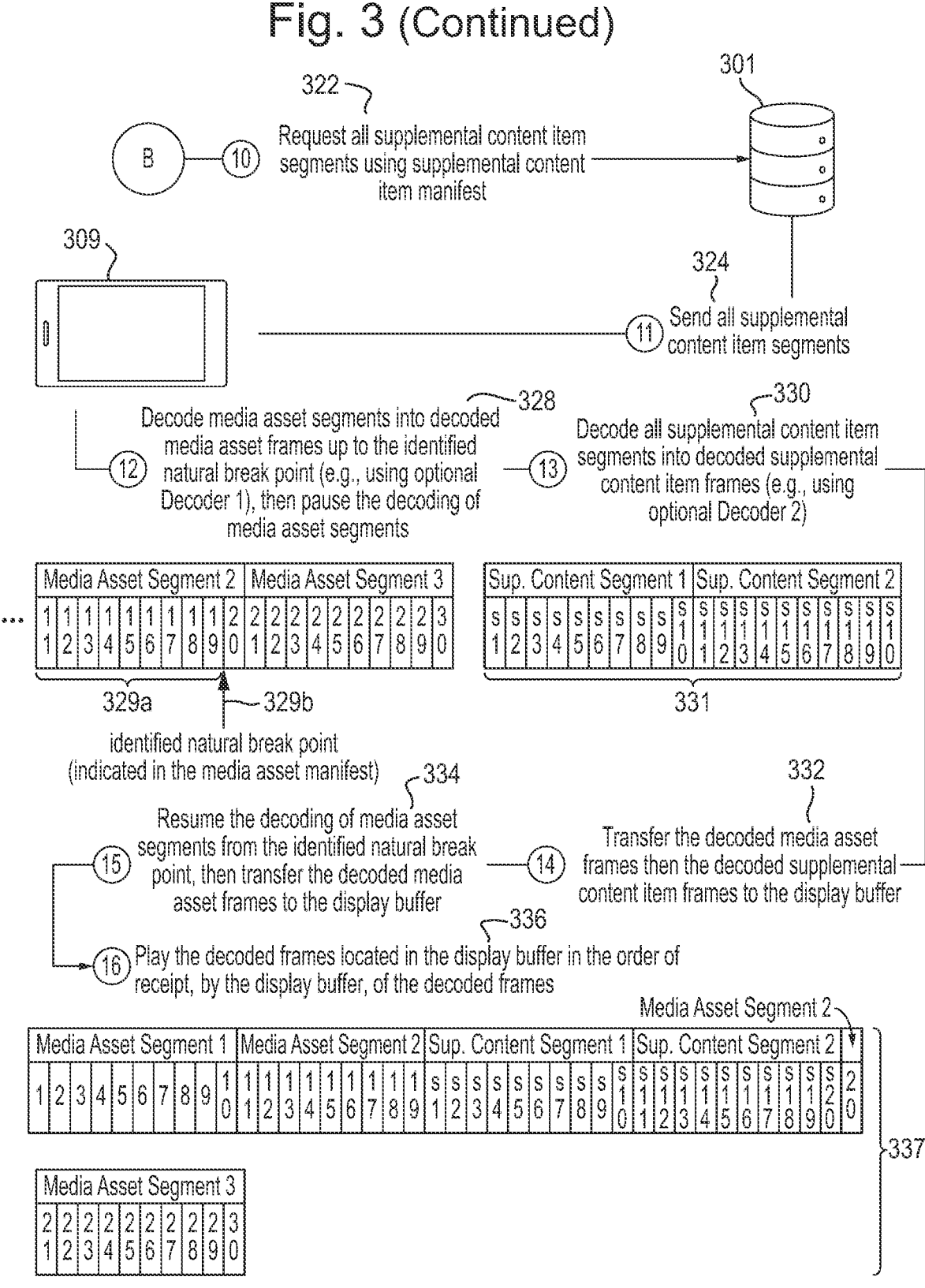
FIG. 3 depicts the steps of an example for seamlessly inserting, by a server, a supplemental content item into an audio-visual media asset, in accordance with some implementations of the disclosure.

FIG. 3 depicts the steps of an example 300 for seamlessly inserting, by a server 301, a supplemental content item into an audio-visual media asset in accordance with some implementations of the disclosure. In some examples, non-transitory computer-readable instructions encoded on a non-transitory computer-readable medium and executed by control circuitry of server 301 seamlessly insert a supplemental content item into an audio-visual media asset. Server 301 is connected to a user device 309 via a communication network (not shown on FIG. 3). (There is no step 302.)

In some implementations, at step 304, server 301 runs an analytic agent (not shown in FIG. 3) to analyze a subset of the audio-visual media asset segments, close to the default supplemental content insertion point so as to identify a natural break point within a segment of the audio-visual media asset. In some examples, server 301 uses a default supplemental content insertion logic to identify a default supplemental content insertion point located in between two consecutive segments. The default supplemental content insertion logic sets a value corresponding to a number of segments of a sequence of segments of the content item intended to be played before starting playing segments of the supplemental content item. For instance, the default supplemental content insertion logic indicates the insertion of the supplemental content item every two audio-visual media asset segments. In some examples, non-transitory computer-readable instructions encoded on a non-transitory computer-readable medium and executed by control circuitry of server

301 comprise the default supplemental content insertion logic. In some examples, non-transitory computer-readable instructions encoded on a non-transitory computer-readable medium and executed by control circuitry of server 301 comprise instructions to control an analytic agent that identifies a natural supplemental content insertion point within the segment of the audio-visual media asset. In some instances, the instructions to control the analytic agent comprises a machine learning model, which distinguishes words of various languages from encoded audio data and closed captions from encoded frames and can identify the beginning and end of sentences, songs and music and monochromatic frames. A natural supplemental content insertion point can be defined according to different selectable definitions, as previously mentioned above.

In some embodiments, at step 306, a natural break point is identified close to the default supplemental content insertion point within a segment of the audio-visual media asset.

In some implementations, at step 308, user device 309 detects a request, by a user, for consuming an audio-visual media asset (e.g., Game of Thrones) via a user input implemented via a user interface e.g., a mouse, a remote control, a tactile screen. User device 309 is any device configured to play a media asset, such as a mobile phone, a tablet, a computer, a television and the likes. In some embodiments, at step 308, user device 309 also initializes a buffer (e.g., a play buffer or a display buffer) to store decoded segments of the audio-visual media asset and the supplemental content item.

In some embodiments, at step 310, user device 309 sends a request for the audio-visual media asset to server 301 via the communication network.

In some implementations, at step 312, server 301 sends, via the communication network, both audio-visual media asset manifest 313*a* (indicating at least one natural break points including the identified natural break point close to the default supplemental content insertion point defined by the default supplemental content insertion logic) and supplemental content manifest 313*b*. Manifest 313*a* of the audio-visual media asset lists e.g., the presence of three segments (Media Asset Segment 1, Media Asset Segment 2 and Media Asset Segment 3), the time period (expressed in seconds) corresponding to each segment, the network address corresponding to each segment and the presence or absence of natural break point. For instance, Media Asset Segment 2 contains one natural break point located at +0:095 s from the start of the media asset or −0:005 s from the end of Media Asset Segment 2. Both time definitions are equivalent to each other. It should be noted that the time examples +0:095 and −0:005 s were chosen to facilitate the understanding of FIG. 3 although they do not reflect the reality as frame rates are above 24 frames per second. The natural break point is located in between frame 19 and frame 20 of the content item. Manifest 313*b* of the supplemental content item lists e.g., the presence of two segments (Supplemental Content Segment 1 and Supplemental Content Segment 2), the time period (expressed in seconds) corresponding to each segment and the network address corresponding to each segment.

In some embodiments, at step 314, user device 309 requests audio-visual media asset segments using the audio-visual media asset manifest 313*a* via the communication network.

In some implementations, at step 316, server 301 sends audio-visual media asset segments to user device 309 via the communication network.

In some embodiments, at step 318, user device 309 plays the audio-visual media asset.

In some implementations, at step 320, the current progression point of the audio-visual media asset (being played) is constantly compared, by user device 309, to the progression point corresponding to the default supplemental content point. If the current progression point and the progression point corresponding to the default supplemental content point are not sufficiently close to each other, steps 314-320 are repeated. If the current progression point and the progression point corresponding to the default supplemental content point are sufficiently close to each other, step 322 is to occur. The expression 'sufficiently close to' refers to the time period (e.g., within 1, 2, 3, 4 or 5 seconds, or within 24, 48, 72, 96 or 120 frames) to reach the progression point corresponding to the default supplemental content point from the current progression point, which must be long enough in order for the user device 309 to identify a natural break point within an audio-visual media asset segment (close to the default supplemental content insertion point) and insert the supplemental content item at the identified natural break point.

In some embodiments, at step 322, user device 309 requests, from server 301, all supplemental content item segments using the supplemental content item manifest 313*b* via the communication network.

In some implementations, at step 324, server 301 sends, to user device 309, all supplemental content item segments using the supplemental content item via the communication network.

In some implementations, at step 328, user device 309 (e.g., using optional decoder 1—See decoder 504 shown on FIG. 5) decodes Media Asset Segment 1 and the portion 329*a* of the Media Asset Segment 2, in other words up to the identified natural break point 329*b*. Then, user device 309 pauses the decoding of the audio-visual media asset segments, leaving aside leftover portion of Media Asset Segment 2 and Media Asset Segment 3, in order to move the decoded frames to the display buffer. The pausing is optional when one decoder decodes the content item while another decoder decodes the supplemental content item. Each audio-visual media asset segment is made of a set of ten frames. These 10 frames are each associated with audio data of the audio-visual media asset. The numeral reference of each frame of each audio-visual media asset segment depends on the position of the frame in the entire sequence of audio-visual media asset segments. The numeral reference of each frame of each audio-visual media asset segment could be thus e.g., 1, 2, 3, 10, 20, 28, or 30. It should be noted that the numeral references correspond to the display order of the frames, which may differ from the decoding order of the frames from a bitstream. The conversion from decoding order to display order of a frame follows the decoding buffer management specified in common codec standards.

In some embodiments, at step 330, user device 309 (e.g., using optional decoder 2—See decoder 510 shown FIG. 5) decodes all supplemental content item segments 331. Each supplemental content item segment is made of a set of ten frames. These 10 frames are each associated with audio data of the supplemental content item. The numeral reference of each frame of each supplemental content item segment depends on the position of the frame in the entire sequence of supplemental content item segments. The numeral reference of each frame of each supplemental content item segment could be thus e.g., S1, S2, S3, S10, S20. It should be noted that the numeral references correspond to the display order of the frames, which may differ from the decoding order of the frames from a bitstream. The conversion from decoding order to display order of a frame follows the decoding buffer management specified in common codec standards.

In some implementations, at step 332, user device 309 transfers the decoded frames of the audio-visual media asset, then the decoded frames of the supplemental content item, to the display buffer.

In some embodiments, at step 334, user device 309 resumes the decoding of the audio-visual media asset segments from the identified natural break point 329*b* so as to decode frame 20 of Media Asset Segment 2 and Media Asset Segment 3. User device 309 then transfers the decoded media asset frames to the display buffer.

In some implementations, at step 336, user device 309 plays the decoded frames located in the display buffer in the order of receipt, by the display buffer, of the decoded frames i.e., /frames 1 to19/frames S1 to S20/frames 20 to 30/. The sequence 337 of decoded frames present in the display buffer is to be played. Sequence 337 of decoded frames corresponds to the supplemental content item-inserted audio-visual media asset. Frame 20 of Media Asset Segment 2 is then located in between Frame S20 of Supplemental Content Segment 2 and Frame 21 of Media Asset Segment 3.

In some embodiments, at step 336, a buffer manager (not shown in FIG. 3) maintains the playing order of the frames as/frames 1 to19/frames S1 to S20/frames 20 to 30/, irrespective of the order of arrival of these frames in the buffer. In some instances, non-transitory computer-readable instructions encoded on a non-transitory computer-readable medium and executed by control circuitry of the client device 309 comprise instructions controlling the buffer manager.

In some implementations, several steps of method 300 use hardware and/or software of server 301. For instance, in some embodiments, step 302 (in which server 301 accesses supplemental content insertion logic, e.g., potentially located in non-transitory computer-readable instructions encoded on a non-transitory computer-readable medium and executed by control circuitry of the client device 309) involves various components of server such as I/O paths (e.g., I/O paths 212 shown in FIG. 2), control circuitry (e.g., control circuitry 210 shown in FIG. 2) and software e.g., system software, utility software, application software. For example, in some implementations, step 304 (in which an analytic agent of server 304 is run to analyze a subset of the audio-visual media asset segments, close to the default supplemental content insertion point so as to identify a natural break point within a segment of the audio-visual media asset) involves various components of server 301 such as control circuitry (e.g., control circuitry 210 shown in FIG. 2) and software e.g., system software, utility software, application software.

Similarly, in some embodiments, several steps of method 300 use hardware and/or software of user device 309. For instance, in some implementations, step 308 (in which user device 309 detects a request made by a user via a user interface of user device 309) involves different components of user device 309 such as a user interface (e.g., user input interface 226 shown in FIG. 2), control circuitry (e.g., control circuitry 218 shown in FIG. 2), I/O paths (e.g., I/O paths 220 depicted in FIG. 2) and software e.g., system software, utility software, application software.

Figure 4:
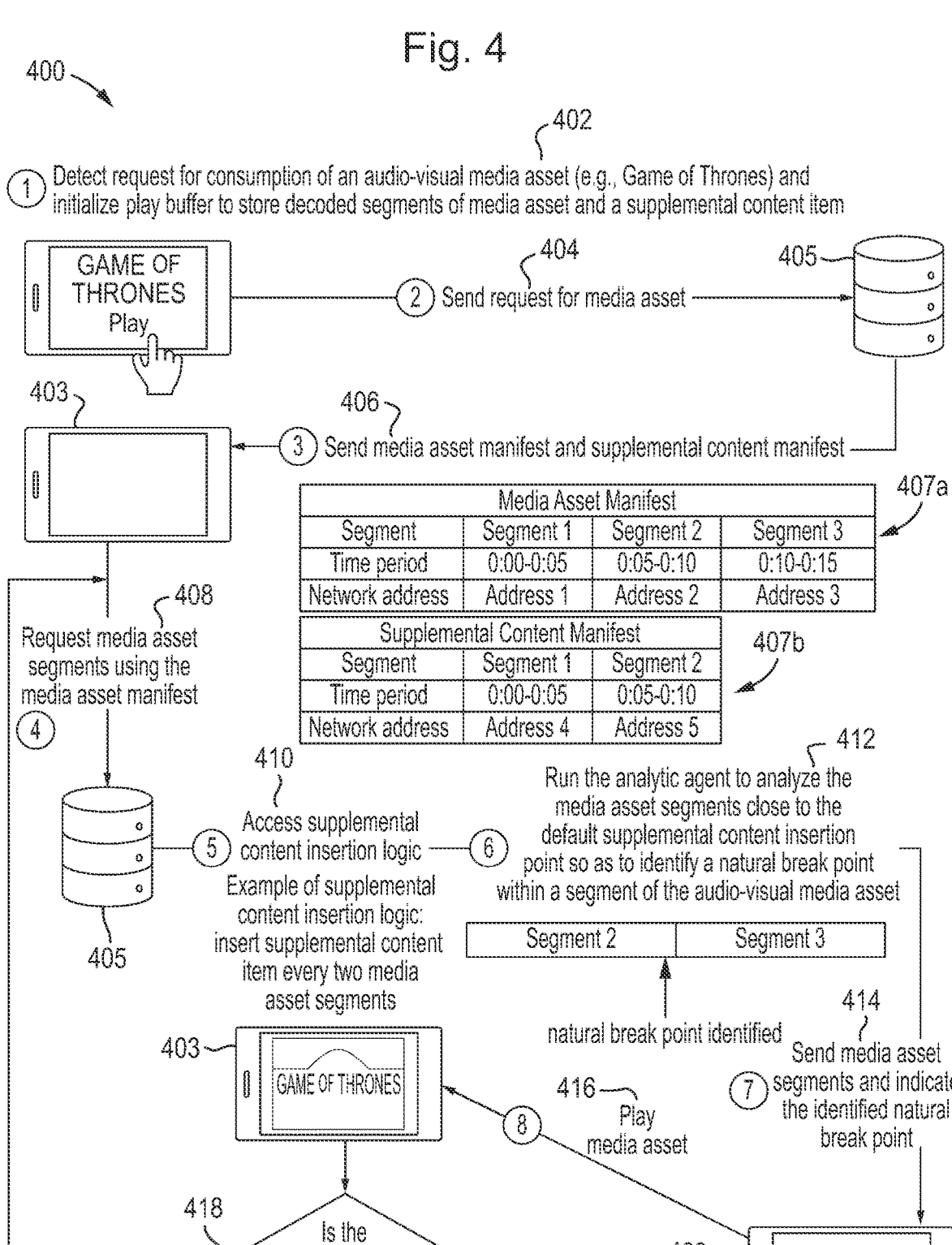
FIG. 4 shows the steps of an example for seamlessly inserting, by a server, a supplemental content item into an audio-visual media asset, in accordance with some implementations of the disclosure.
Figure 4:
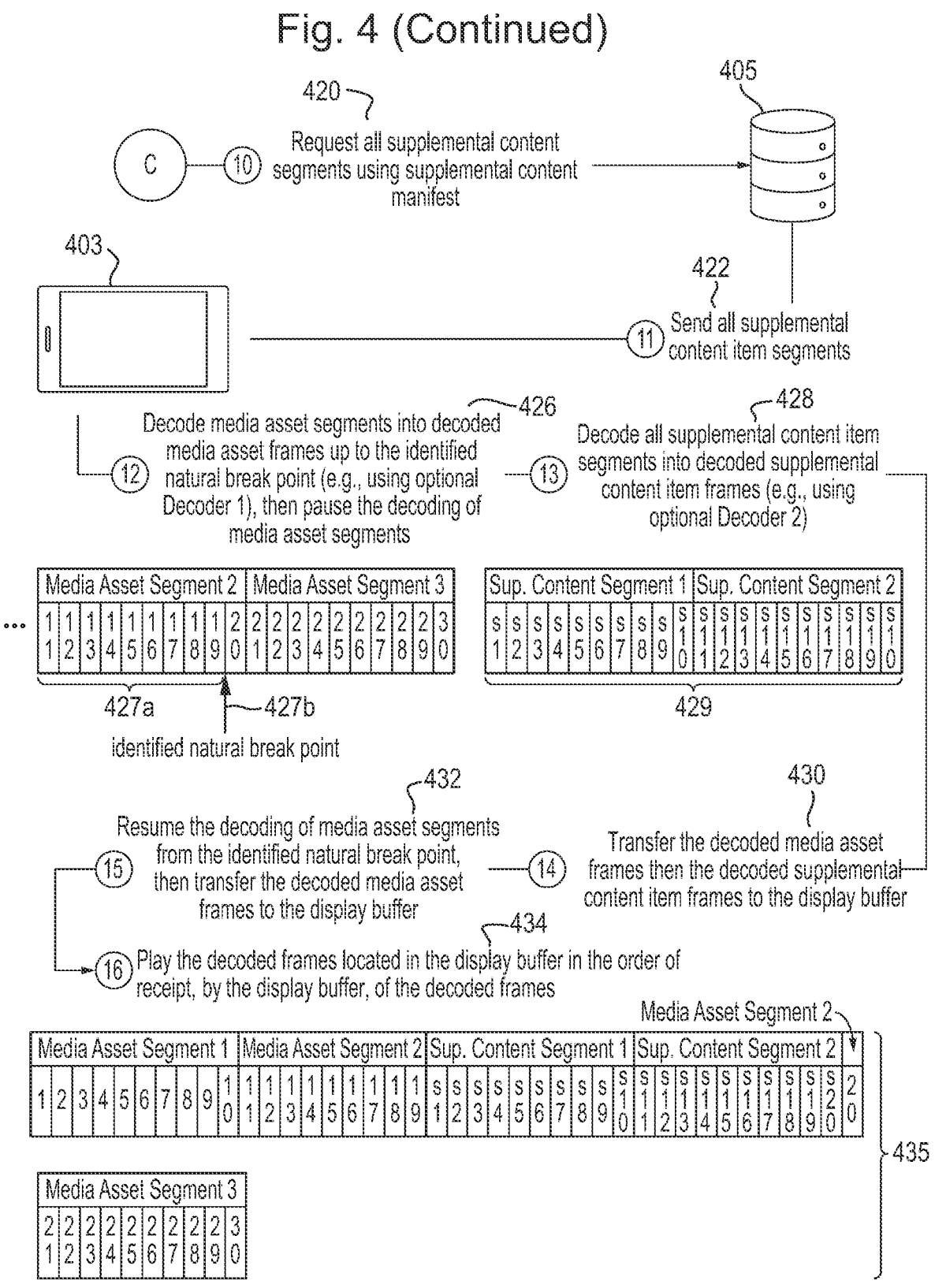

FIG. 4 shows the steps of an example 400 for seamlessly inserting, by a server 405, a supplemental content item into an audio-visual media asset in accordance with some implementations of the disclosure. In some examples, non-transitory computer-readable instructions encoded on a non-transitory computer-readable medium and executed by control circuitry of server 405 seamlessly insert a supplemental content item into an audio-visual media asset. Server 405 is connected to a user device 403 via a communication network (not shown on FIG. 4).

In some embodiments, at step 402, user device 403 detects a request, by a user, for consuming an audio-visual media asset (e.g., Game of Thrones) via a user input implemented via a user interface e.g., a mouse, a remote control, a tactile screen. User device 403 is any device configured to play a content item, such as a mobile phone, a tablet, a computer, a television and the likes. In some embodiments, at step 402, user device 403 also initializes a buffer (e.g., a play buffer or a display buffer) to store decoded segments of the audio-visual media asset and the supplemental content item.

In some implementations, at step 404, user device 403 sends a request for the audio-visual media asset to server 405 via the communication network.

In some embodiments, at step 406, server 405 sends both the manifest 407a of the audio-visual media asset and the manifest 407b of the supplemental content item to user device 403 via the communication network. Manifest 407a of the audio-visual media asset lists e.g., the presence of three segments (Media Asset Segment 1, Media Asset Segment 2 and Media Asset Segment 3), the time period (expressed in seconds) corresponding to each segment and the network address corresponding to each segment. Manifest 407b of the supplemental content item lists e.g., the presence of two segments (Supplemental Content Segment 1 and Supplemental Content Segment 2), the time period (expressed in seconds) corresponding to each segment and the network address corresponding to each segment.

In some implementations, at step 408, user device 403 requests, from server 405, audio-visual media using manifest 407a via the communication network.

In some embodiments, at step 410, server 405 accesses the supplemental content insertion logic. The supplemental content insertion logic establishes the rule of inserting the supplemental content item into the audio-visual media asset and thus defines the location of the default supplemental content insertion point. For instance, the supplemental content item is to be inserted every two audio-visual media asset segments, implying that a default supplemental content insertion point is to be located right after two consecutive audio-visual media asset segments. Both the number of audio-visual media asset segments (after which supplemental content item segments are inserted) and the number of supplemental content item segments to be inserted can be set to any figures determined by the supplemental content insertion logic. In some examples, non-transitory computer-readable instructions encoded on a non-transitory computer-readable medium and executed by control circuitry of the server 405 comprise the supplemental content insertion logic.

In some implementations, at step 412, server 405 runs an analytic agent (not shown in FIG. 4) to analyze the audio-visual media asset segments, close to the default supplemental content insertion point so as to identify a natural break point within a segment of the audio-visual media asset. In some examples, non-transitory computer-readable instructions encoded on a non-transitory computer-readable medium and executed by control circuitry of server 405 comprise instructions to control an analytic agent that identifies a natural supplemental content insertion point within a segment of the audio-visual media asset. In some instances, the instructions to control the analytic agent comprises a machine learning model, which distinguishes words of various languages from encoded audio data and closed captions from encoded frames and can identify the beginning and end of sentences, songs and music and monochromatic frames. A natural supplemental content insertion point can be defined according to different selectable definitions, as previously mentioned above.

In some embodiments, at step 414, server 405 sends audio-visual media asset segments to user device 403 via the communication network and indicate the identified natural break point.

In some implementations, at step 416, user device 403 plays the audio-visual media asset.

In some embodiments, at step 418, the current progression point of the audio-visual media asset (being played) is constantly compared, by user device 403, to the progression point corresponding to the default supplemental content point. If the current progression point and the progression point corresponding to the default supplemental content point are not sufficiently close to each other, steps 408-418 are repeated. If the current progression point and the progression point corresponding to the default supplemental content point are sufficiently close to each other, step 420 is to occur. The expression 'sufficiently close to' refers to the time period (e.g., within 1, 2, 3, 4 or 5 seconds, or within 24, 48, 72, 96 or 120 frames) to reach the progression point corresponding to the default supplemental content point from the current progression point, which must be long enough in order for the user device 403 to identify a natural break point within an audio-visual media asset segment (close to the default supplemental content insertion point) and insert the supplemental content item at the identified natural break point.

In some implementations, at step 420, user device 403 requests all supplemental content item segments using the supplemental content item manifest 407b via the communication network.

In some embodiments, at step 422, server 405 sends all supplemental content item segments to user device 403 via the communication network. (There is no step 424.)

In some embodiments, at step 426, user device 403 (e.g., using optional decoder 1—See decoder 504 shown on FIG. 5) decodes Media Asset Segment 1 and the portion 427a of the Media Asset Segment 2, in other words up to the identified natural break point 427b. Then, user device 403 pauses the decoding of the audio-visual media asset segments, leaving aside leftover portion of Media Asset Segment 2 and Media Asset Segment 3, in order to move the decoded frames to the display buffer. The pausing is optional when one decoder decodes the content item while another decoder decodes the supplemental content item. Each audio-visual media asset segment is made of a set of ten frames. These 10 frames are each associated with audio data of the audio-visual media asset. The numeral reference of each frame of each audio-visual media asset segment depends on the position of the frame in the entire sequence of audio-visual media asset segments. The numeral reference of each frame of each audio-visual media asset segment could be thus e.g., 1, 2, 3, 10, 20, 28, or 30. It should be noted that the numeral references correspond to the display order of the frames, which may differ from the decoding order of the frames from a bitstream. The conversion from decoding order to display order of a frame follows the decoding buffer management specified in common codec standards.

In some implementations, at step 428, user device 403 (e.g., using optional decoder 2—See decoder 510 shown on FIG. 5) decodes all supplemental content item segments 429. Each supplemental content item segment is made of a set of ten frames. These 10 frames are each associated with audio data of the supplemental content item. The numeral reference of each frame of each supplemental content item segment depends on the position of the frame in the entire sequence of supplemental content item segments. The numeral reference of each frame of each supplemental content item segment could be thus e.g., S1, S2, S3, S10, S20. It should be noted that the numeral references correspond to the display order of the frames, which may differ from the decoding order of the frames from a bitstream. The conversion from decoding order to display order of a frame follows the decoding buffer management specified in common codec standards.

In some embodiments, at step 430, user device 403 transfers the decoded frames of the audio-visual media asset, then the decoded frames of the supplemental content item to the display buffer.

In some implementations, at step 432, user device 403 resumes the decoding of the audio-visual media asset segments from the identified natural break point 427b so as to decode frame 20 of Media Asset Segment 2 and Media Asset Segment 3. User device 403 then transfers the decoded media asset frames to the display buffer.

In some embodiments, at step 434, user device 403 plays the decoded frames located in the display buffer in the order of receipt, by the display buffer, of the decoded frames, i.e., /frames 1 to 19/frames S1 to S20/frames 20 to 30/. The sequence 435 of decoded frames present in the display buffer is to be played. Sequence 435 of decoded frames corresponds to the supplemental content item-inserted audio-visual media asset. Frame 20 of Media Asset Segment 2 is then located in between Frame S20 of Supplemental Content Segment 2 and Frame 21 of Media Asset Segment 3.

In some embodiments, at step 434, a buffer manager (e.g., buffer manager 514 shown in FIG. 5) maintains the playing order of the frames as/frames 1 to 19/frames S1 to S20/frames 20 to 30/, irrespective of the order of arrival of these frames in the buffer. In some instances, non-transitory computer-readable instructions encoded on a non-transitory computer-readable medium and executed by control circuitry of the client device 309 comprise instructions controlling the buffer manager.

In some implementations, several steps of method 400 use hardware and/or software of server 405. For instance, in some embodiments, step 406 (in which server 403 sends both the manifest 407a of the audio-visual media asset and the manifest 407b of the supplemental content item to user device 403) involves various components of server 405 such as I/O paths (e.g., I/O paths 212 shown in FIG. 2), control circuitry (e.g., control circuitry 210 shown in FIG. 2) and software e.g., system software, utility software, application software. For example, in some implementations, step 414 (in which server 405 sends audio-visual media asset segments to user device 403 and indicates the identified natural break point) involves various components of server 405 (such as I/O paths e.g., I/O paths 212 shown in FIG. 2), control circuitry (e.g., control circuitry 210 shown in FIG. 2) and software e.g., system software, utility software, application software.

Similarly, in some embodiments, several steps of method 400 uses hardware and/or software of user device 403. For instance, step 402 (in which user device 403 detects a request made by a user via a user interface of user device 309) involves different components of user device 403 such as a user interface (e.g., user input interface 226 shown in FIG. 2), control circuitry (e.g., control circuitry 218 shown in FIG. 2), I/O paths (e.g., I/O paths 220 depicted in FIG. 2) and software e.g., system software, utility software, application software.

Figure 5:
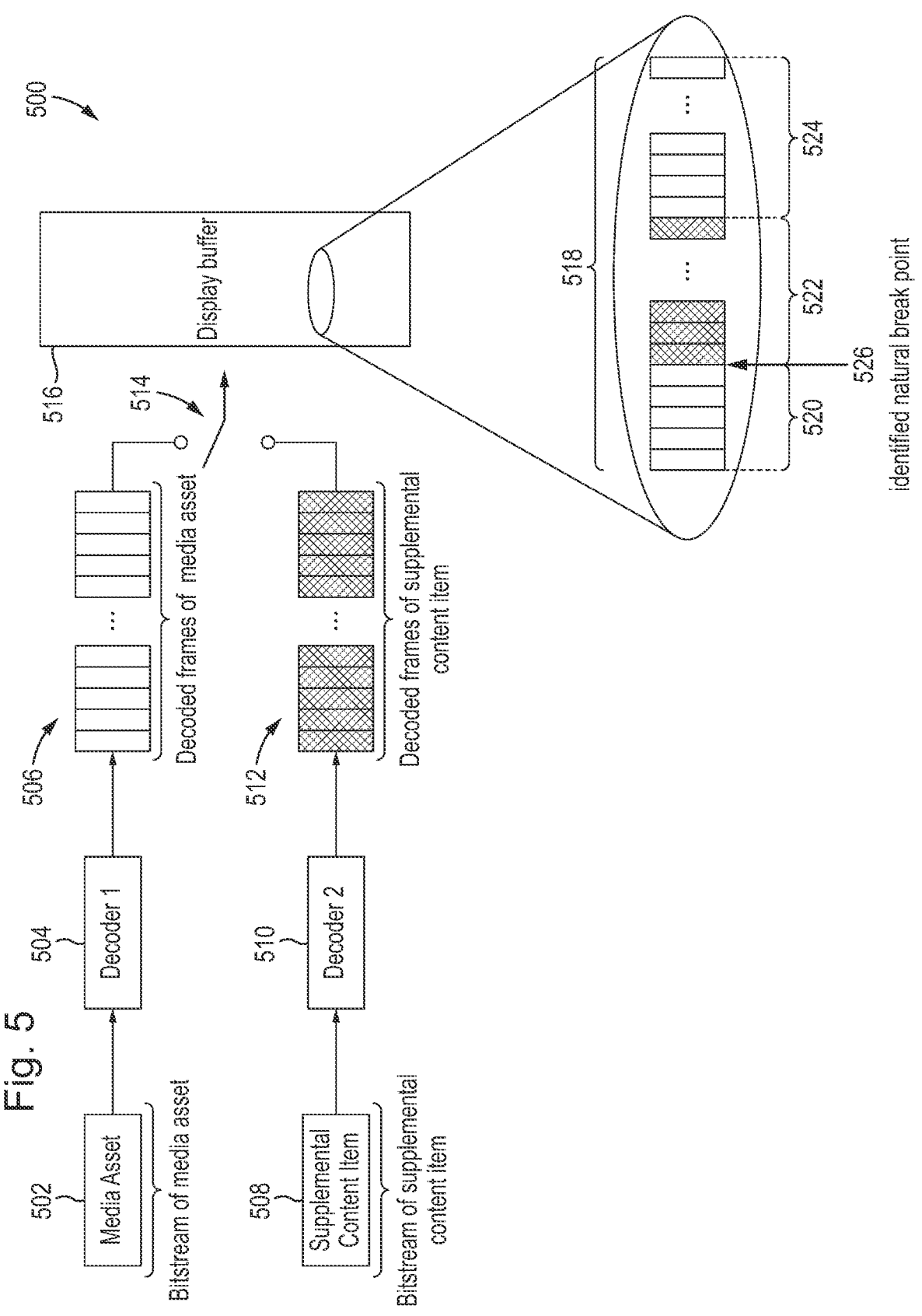
FIG. 5 represents components of an example for seamlessly inserting a supplemental content item into an audio-visual media asset, in accordance with some implementations of the disclosure.
Figure 6:
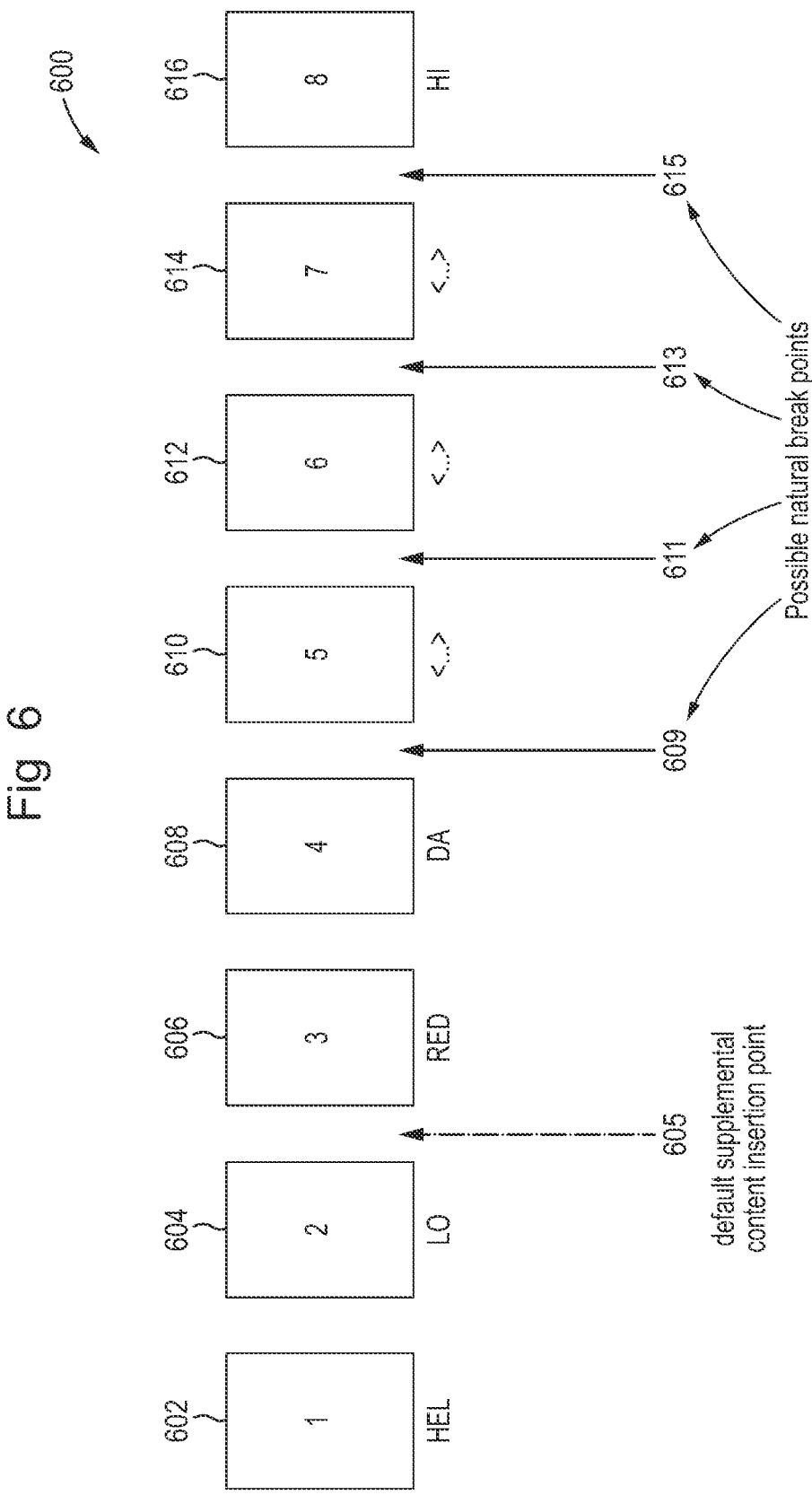
FIG. 6 illustrates four natural supplemental content insertion point examples distributed in between frame/audio data pairs of a sequence of frame/audio data pairs related to an audio-visual media asset, in accordance with some implementations of the disclosure.

FIG. 5 represents an example 500 for seamlessly inserting a supplemental content item into an audio-visual media asset (e.g., audio-visual media asset of step 102 in FIG. 1, audio-visual media asset of step 308 in FIG. 3, audio-visual media asset of step 402 in FIG. 4, audio-visual media asset whose sequence 600 of frame/audio data pairs is shown in FIG. 6, content item of step 702 in FIG. 7, content item of step 808 in FIG. 8, content item of step 902 in FIG. 9), in accordance with some implementations of the disclosure.

In some embodiments, example 500 comprises two decoders 504 and 510 operating in parallel, a display buffer manager 514 and a display buffer 516.

In some implementations, decoder 504 decodes bitstream 502 of an audio-visual media asset into decoded frames 506 of the audio-visual media asset while decoder 510 decodes bitstream 508 of a supplemental content item into decoded frames 512 of the supplemental content item.

In some embodiments, at each instant, display buffer manager 514 selects a decoded frame from the set of the decoded frames 506 of the audio-visual media asset or from the set of the decoded frames 512 of the supplemental content item and places the selected decoded frame into display buffer 516 so as to form sequence 518 of decoded frames. Display buffer manager 514 switches from the decoded frames 506 of the audio-visual media asset to the decoded frames 512 of the supplemental content item at a natural break point 526 previously identified by an analytic agent (not shown in FIG. 5). In some instances, non-transitory computer-readable instructions encoded on a non-transitory computer-readable medium and executed by control circuitry of a client device (e.g., user device 103, computing device 202, user device 309, user 403, client device 701, client device 809 or client 901) or a server (e.g., server 105, server 204, server 301, server 405, server 703, server 801 or server 905) comprise instructions to control the analytic agent. Display buffer manager 514 switches back from the decoded frames 512 of the supplemental content item to the decoded frames 506 of the audio-visual media asset when the last decoded frame of the supplemental content item has been sent to display buffer 516.

In some implementations, at a given time, a sequence 518 of decoded frames is formed in display buffer 516. Sequence 518 comprises decoded frames from the set of the decoded frames 506 of the audio-visual media asset and from the set of the decoded frames 512 of the supplemental content item. The first five frames 520 of sequence 518 and the frames 524 of sequence 518 are decoded frames from the audio-visual media asset, while the decoded frames 522 from the supplemental content item are located in between the first five frames 520 and the frames 524 of the audio-visual media asset. Supplemental content item is accordingly inserted into the audio-visual media asset at the identified natural break point 526 after the decoding process has been implemented.

In some approaches, the first decoder and the second decoders are hardware. In some approaches, non-transitory computer-readable instructions encoded on a non-transitory computer-readable medium and executed by control circuitry of the client device (e.g., user device 103, computing device 202, user device 309, user 403, client device 701, client device 809 or client 901) comprise the first decoder and the second decoder.

FIG. 6 illustrates four natural supplemental content insertion point examples 609, 611, 613 and 615 distributed in between frame/audio data pairs of a sequence 600 of frame/ audio data pairs related to an audio-visual media asset (e.g., audio-visual media asset of step 102 in FIG. 1, audio-visual media asset of step 308 in FIG. 3, audio-visual media asset of step 402 in FIG. 4, audio-visual media asset comprising bitstream 502 in FIG. 5, content item of step 702 in FIG. 7, content item of step 808 in FIG. 8, content item of step 902 in FIG. 9) in accordance with some implementations of the disclosure. Each frame/audio data pair corresponds to a frame of the audio-visual media asset and audio data of the audio-visual media asset associated with the frame.

In some embodiments, sequence 600 comprises eight frame/audio data pairs 602, 604, 606, 608, 610, 612, 614 and 616. Frame/audio data pair 602 comprises audio data corresponding to the first syllabus of the word 'hello'. Frame/ audio data pair 604 comprises audio data corresponding to the second syllabus of the word 'hello'. Frame/audio data pair 606 comprises audio data corresponding to the first syllabus of the first name 'Reda'. Frame/audio data pair 608 comprises audio data corresponding to the second syllabus of the first name 'Reda'. Frame/audio data pair 610 comprises audio data deprived of pronounced words symbolized by '< . . . >' Similarly, frame/audio data pairs 612 and 614 comprise audio data deprived of pronounced words. Frame/ audio data pair 616 comprises audio data corresponding to the greeting word 'Hi'. The default supplemental content insertion point 605 is located in between frame/audio data pairs 604 and 606 which represent the boundary end of a segment and the boundary end of another segment, respectively. Possible natural break points 609, 611, 613 and 615 are located in between two frame/audio data pairs, more precisely adjacent to at least one frame/audio data pair whose audio data is deprived of pronounced words.

In some embodiments, closed captions relating to pronounced words are integrated in the frames of the frame/ audio data pairs 602-608 and 616 whose audio data comprise pronounced words. Natural break points 609, 611, 613 and 615 remain possible natural break points as the audio data of frame/audio data pairs 610, 612 and 614 are deprived of pronounced words and the frames of frame/audio data pairs 610, 612 and 614 are exempt of closed captions.

In some implementations, closed captions relating to a scene description (e.g., "individual waving their hand") are integrated in the frame of frame/audio data pair 612 whose audio data are originally deprived of syllabus of a pronounced word. Natural break points 609, 611, 613 and 615 remain possible natural break points as these natural break points remain adjacent to a frame exempt of closed captions and associated with audio data exempt of pronounced words.

FIG. 7 depicts a flowchart describing an example 700 for seamlessly inserting, by a client device 701, a supplemental content item into a content item in accordance with some implementations of the disclosure. In some approaches, non-transitory computer-readable instructions encoded on a non-transitory computer-readable medium and executed by control circuitry of client device 701 seamlessly insert a supplemental content item into a media content. Client device 701 comprises any user device configured to play a content item, such as a mobile phone, a tablet, a computer, a television and the likes. Client device 701 is connected to a server 703 via a communication network (not shown on FIG. 7).

In some embodiments, at step 702, control circuitry (e.g., control circuitry 218 shown in FIG. 2) of client device 701 (e.g., user device 103 shown in FIG. 1, computing device 202 depicted in FIG. 2) detects a request for consumption of a content item (e.g., manifest 107*a*-related content item from FIG. 1) made by a user via a user interface (e.g. user input interface 226 depicted in FIG. 2) of the client device 701 via I/O paths (e.g., I/O paths 220 depicted in FIG. 2) of client device 701.

In some embodiments, at step 703*a*, control circuitry of client device 701 (e.g., user device 103, computing device 202) initializes buffer (e.g., a play buffer or a display buffer) to store decoded frames of the content item and the supplemental content item.

In some implementations, at step 704, control circuitry of client device 701 (e.g., user device 103, computing device 202) sends a request for the content item to a server 703 (e.g., server 105, server 204) via I/O paths of client device 701 and the communication network.

In some implementations, at step 706, control circuitry of client device 701 (e.g., user device 103, computing device 202) receives a content item manifest (e.g., content item manifest 107*a*) from server 703 (e.g., server 105, server 204), via I/O paths of client device 701 and the communication network. In some examples, the content item manifest (e.g., content item manifest 107*a*) contains information about the supplemental content item segments. In some examples, control circuitry of client device 701 (e.g., user device 103, computing device 202) receives a content item manifest (e.g., content item manifest 107*a*) and a supplemental content item manifest (e.g., supplemental content item manifest 107*b*) from server 703 (e.g., server 105, server 204), via I/O paths of client device 701 and the communication network.

In some embodiments, at step 708, control circuitry of client device 701 (e.g., user device 103, computing device 202) requests content item segments, from server 703 (e.g., server 105, server 204), using the content item manifest (e.g., content item manifest 107*a*), via I/O paths of client device 701 and the communication network.

In some implementations, at step 710, control circuitry of client device 701 (e.g., user device 103, computing device 202) receives content item segments from server 703 (e.g., server 105, server 204) via I/O paths of client device 701 and the communication network.

In some embodiments, at step 712, control circuitry of client device 701 (e.g., user device 103, computing device 202) accesses supplemental content insertion logic (e.g., example of supplemental content insertion logic shown in step 112 of FIG. 1) possibly via I/O paths of client device 701 to identify a default supplemental content insertion point between a first segment of the content item and a second segment of the content item, wherein the first segment and second segment are any two consecutive segments. The adjectives 'first' and 'second' qualifying the expression 'segment of the content item' are in effect simply used to distinguish between the segments they qualify and are not to be understood to indicate a specific position of the segments they qualify in the sequence of segments of the content item corresponding to the entire runtime of the content item. Both the number of content item segments (after which supplemental content item segments are inserted) and the number of supplemental content item segments to be inserted are set to any figures determined by the supplemental content insertion logic. In some examples, non-transitory computer-readable instructions encoded on a non-transitory computer-readable medium and executed by control circuitry of the client device 701 comprise the supplemental content insertion logic.

In some implementations, at step 714, control circuitry of client device 701 (e.g., user device 103, computing device 202) analyzes the first segment of the content item and the second segment of the content item to identify a natural supplemental content insertion point (e.g., natural break point 125*b* shown in FIG. 1) within the first segment or the second segment. Control circuitry of client device 701 runs an analytic agent to analyze the first segment and second segment, close to the default supplemental content insertion point so as to identify a natural break point within the first segment or the second segment of the content item. In some examples, non-transitory computer-readable instructions encoded on a non-transitory computer-readable medium and executed by control circuitry of client device 701 comprise instructions to control the analytic agent that identifies a natural supplemental content insertion point within the first segment or the second segment. In some instances, the instructions to control the analytic agent comprises a machine learning model, which distinguishes words of various languages from encoded audio data and closed captions from encoded frames and can identify the beginning and end of sentences, songs and music and monochromatic frames. In response to the identifying the natural supplemental content insertion point, steps 722-730 are triggered in the following order: step 722, any one of steps 724 to 728, any one of steps 724 to 728 that has not been implemented yet, any one of steps 724 to 728 that has not been implemented yet and finally step 730.

In some embodiments, at step 716, control circuitry of client device 701 (e.g., user device 103, computing device 202) requests segments of supplemental content item, from server 703 (e.g., server 105, server 204), using the supplemental content item manifest (e.g., supplemental content item manifest 107*b*), via I/O paths of client device 701 and the communication network.

In some implementations, at step 718, control circuitry of client device 701 (e.g., user device 103, computing device 202) receives supplemental content item segments from server 703 (e.g., server 105, server 204) via I/O paths of client device 701 and the communication network. (There is no step 720.)

In some implementations, at step 722, control circuitry of client device 701 (e.g., user device 103, computing device 202) overrides insertion of the supplemental content item at the default supplemental content insertion point.

In some embodiments, at step 724, control circuitry of client device 701 (e.g., user device 103, computing device 202) decodes a first set of frames of the content item up to the natural supplemental content insertion point (e.g., using a first decoder e.g., decoder 504 in FIG. 5) and places the first set of frames into the buffer.

In some implementations, at step 726, control circuitry of client device 701 (e.g., user device 103, computing device 202) decodes a second set of frames of the supplemental content item (e.g., using a second decoder e.g., decoder 510 in FIG. 5) and places the second set of frames into the buffer.

In some embodiments, at step 728, control circuitry of client device 701 (e.g., user device 103, computing device 202) decodes a third set of frames of the content item from the natural supplemental content insertion point (e.g., using the first decoder) and places the third set of frames into the buffer.

In some implementations, at step 730, control circuitry of client device 701 (e.g., user device 103, computing device 202) plays frames from the buffer via I/O paths of client device 701. In some examples, at step 730, control circuitry of client device 701 plays the decoded frames located in the display buffer (e.g., buffer 516 in FIG. 5) in the order of receipt, by the display buffer, of the decoded frames i.e.,/first set of frames/second set of frames/third set of frames/. In some examples, at step 730, a buffer manager (e.g., buffer manager 516 shown in FIG. 5) maintains the playing order of the decoded frames as/first set of frames/second set of frames/third set of frames/irrespective of the order of receipt, by the display buffer, of the decoded frames. In some instances, non-transitory computer-readable instructions encoded on a non-transitory computer-readable medium and executed by control circuitry of client device 701 comprise instructions controlling the buffer manager (e.g., buffer manager 514 in FIG. 5).

FIG. 8 shows a flowchart describing an example 800 for seamlessly inserting, by a server 801, a supplemental content item into a content item in accordance with some implementations of the disclosure. In some approaches, non-transitory computer-readable instructions encoded on a non-transitory computer-readable medium and executed by control circuitry of server 801 seamlessly insert a supplemental content item into a content item. Server 801 is connected to a client device 809 via a communication network (not shown on FIG. 8). Client device 809 comprises any user device configured to play a media content such as a mobile phone, a tablet, a computer, a television and the likes. (There is no step 802.)

In some embodiments, at step 804, control circuitry of server 801 (e.g., server 204, server 301) analyzes a subset of segments of the content item to identify a plurality of natural supplemental content insertion points, wherein the plurality of natural supplemental content insertion points comprises a natural supplemental content insertion point (e.g., natural break point 329*b* shown in FIG. 3) in the first segment of the content item or the second segment of the content item. In some examples, the subset of segments of the content item are selected using a default supplemental content insertion logic that sets the number of segments of the content item to be played before playing the segments of the supplemental content item and thus identifies at least one default supplemental content insertion point. Control circuitry of server 801 runs an analytic agent to analyze the first segment and second segment, close to the default supplemental content insertion point so as to identify a natural break point within the first segment or second segment. In some examples, non-transitory computer-readable instructions encoded on a non-transitory computer-readable medium and executed by control circuitry of server 801 comprise instructions to control the analytic agent that identifies a natural supplemental content insertion point within the first segment or the second segment. In some instances, the instructions to control the analytic agent comprises a machine learning model, which distinguishes words of various languages from encoded audio data and closed captions from encoded frames and can identify the beginning and end of sentences, songs and music and monochromatic frames.

In some implementations, at step 806, control circuitry of server 801 (e.g., server 204, server 301) creates a manifest for the content item (e.g., manifest 313*a*) indicating the natural supplemental content insertion points.

In some embodiments, at step 808, control circuitry (e.g., control circuitry 218 depicted in FIG. 2) of client device 809 (e.g., computing device 202, user device 309) detects request for consumption of a content item (e.g., manifest 313*a*-related content item from FIG. 3), made by a user via a user interface (e.g. user input interface 226 depicted in FIG. 2) of client device 809 via I/O paths (e.g., I/O paths 220 depicted in FIG. 2) of client device 809.

In some implementations, at step 809*a*, control circuitry of client device 809 (e.g., computing device 202, user device 309) initializes buffer (e.g., a play buffer or a display buffer) to store decoded frames of the content item and the supplemental content item.

In some implementations, at step 810, control circuitry of server 801 (e.g., server 204, server 301) receives a request for the content item from the client device 809 (e.g., computing device 202, user device 309) via I/O paths of server 801 and the communication network.

In some embodiments, at step 812, control circuitry of server 801 (e.g., server 204, server 301) sends the content item manifest (e.g., manifest 313*a*) to client device 809 (e.g., computing device 202, user device 309), via I/O paths of server 801 and the communication network. In some examples, the content item manifest (e.g., manifest 313*a*) contains information about the supplemental content item segments. In some examples, control circuitry of server 801 (e.g., server 204, server 301) sends the content item manifest (e.g., manifest 313*a*) and a supplemental content item manifest (e.g., manifest 313*b*) to client device 809 (e.g., computing device 202, user device 309), via I/O paths of server 801 and the communication network. By sending the manifest for the content item to client device 809, server 801 causes client device 809 (e.g., user device 309) to perform steps 826-832 in the following order: any one of steps 826 to 830, any one of steps 826 to 830 that has not been implemented yet, any one of steps 826 to 830 that has not been implemented yet, finally step 832.

In some implementations, at step 814, control circuitry of server 801 (e.g., server 204, server 301) receives a request for content item segments, from client device 809 (e.g., computing device 220, user device 309), using the content item manifest (e.g., manifest 313*a*) via I/O paths of server 801 and the communication network.

In some embodiments, at step 816, control circuitry of server 801 (e.g., server 204, server 301) sends content item segments to the client device 809 (e.g., computing device 202, user device 309) via I/O paths of server 801 and the communication network.

In some implementations, at step 818, control circuitry of server 801 (e.g., server 204, server 301) receives a request for supplemental content item segments, from client device 809 (e.g., computing device 202, user device 309), using the supplemental content item manifest (e.g., manifest 313*b*) via I/O paths of server 801 and the communication network.

In some embodiments, at step 820, control circuitry of server 801 (e.g., server 204, server 301) sends supplemental content item segments to client device 809 (e.g., computing device 202, user device 309) via I/O paths of server 801 and the communication network. (There are no steps 822 and 824.)

In some implementations, at step 826, control circuitry of client device 809 (e.g., user device 309) decodes a first set of frames of the content item up to the natural supplemental content insertion point (e.g., using a first decoder e.g., decoder 504 in FIG. 5) and places the first set of frames into the buffer.

In some embodiments, at step 828, control circuitry of client device 809 (e.g., computing device 202, user device 309) decodes a second set of frames of the supplemental content item (e.g., using a second decoder e.g., decoder 510 in FIG. 5) and places the second set of frames into the buffer.

In some implementations, at step 830, control circuitry of client device 809 (e.g., computing device 202, user device 309) decodes a third set of frames of the content item from the natural supplemental content insertion point (e.g., using the first decoder) and places the third set of frames into the buffer.

At step 832, control circuitry of client device 809 (e.g., computing device 202, user device 309) plays frames from the buffer via I/O paths of client device 809. In some examples, at step 832, control circuitry of client device 809 plays the decoded frames located in the display buffer (e.g., buffer 516 in FIG. 5) in the order of receipt, by the display buffer, of the decoded frames i.e.,/first set of frames/second set of frames/third set of frames/. In some examples, at step 730, a buffer manager (e.g., buffer manager 516 in FIG. 5) maintains the playing order of the decoded frames as/first set of frames/second set of frames/third set of frames/irrespective of the order of receipt, by the display buffer, of the decoded frames. In some instances, non-transitory computer-readable instructions encoded on a non-transitory computer-readable medium and executed by control circuitry of client device 809 comprise instructions controlling the buffer manager.

Figure 9:
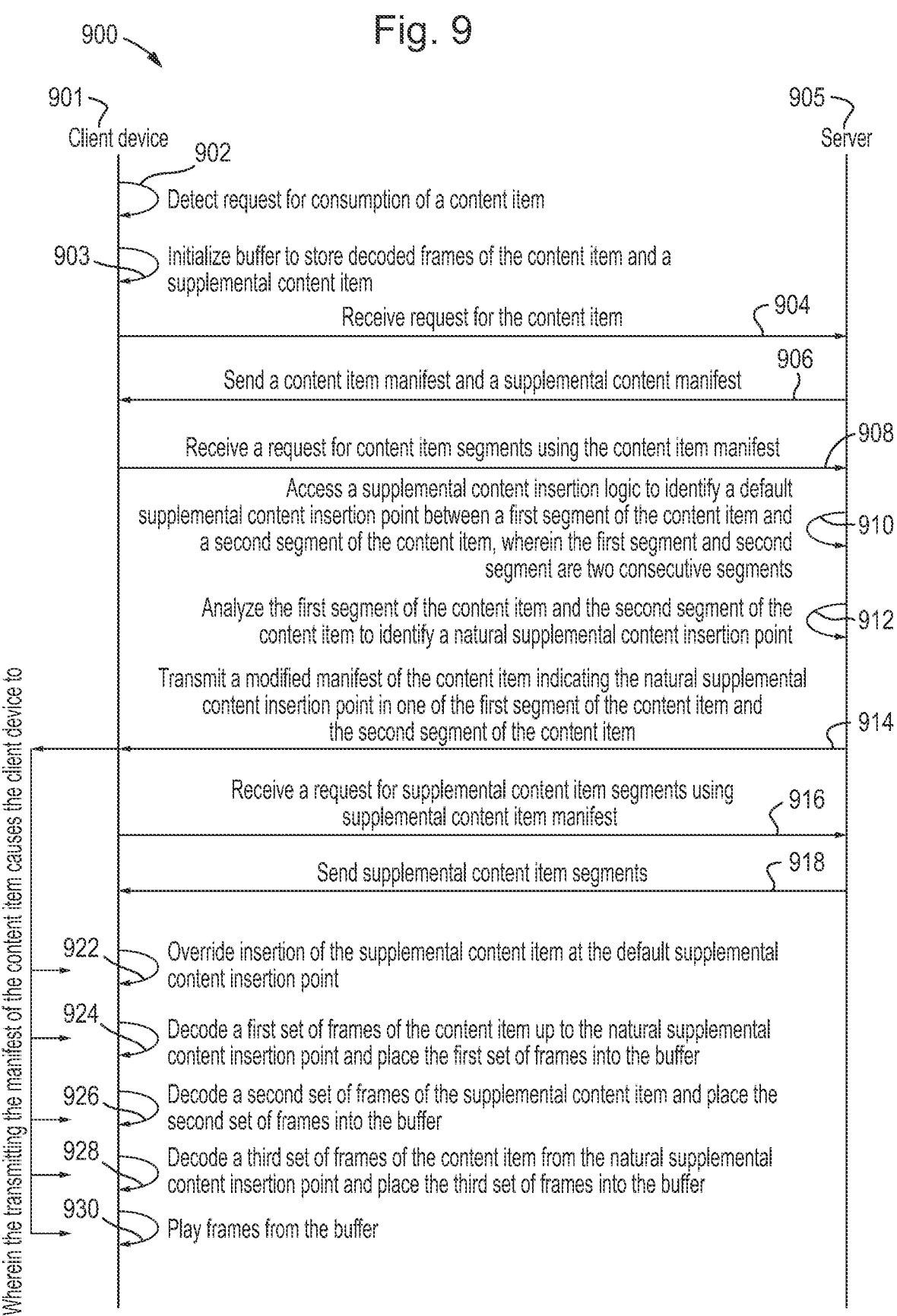
FIG. 9 represents a flowchart describing an example for seamlessly inserting, by a server, a supplemental content item into a content item in accordance with some implementations of the disclosure.

FIG. 9 represents a flowchart describing another example 900 for seamlessly inserting, by a server 905, a supplemental content item into a content item in accordance with some implementations of the disclosure. In some approaches, non-transitory computer-readable instructions encoded on a non-transitory computer-readable medium and executed by control circuitry of server 905 seamlessly insert a supplemental content item into a content item. Server 905 is connected to a client device 901 via a communication network (not shown on FIG. 9). Client device 901 comprises any user device configured to play a media content such as a mobile phone, a tablet, a computer, a television and the likes.

In some embodiments, at step 902, control circuitry (e.g., control circuitry 218 shown in FIG. 2) of a client device 901 (e.g., computing device 202 shown in FIG. 1, user device 403 depicted in FIG. 4) detects a request for consumption of a content item (e.g., manifest 407*a*-related content item from FIG. 4) made by a user via a user interface (e.g. user input interface 226 depicted in FIG. 2) of the client device 901 via I/O paths (e.g., I/O paths 220 depicted in FIG. 2) of client device 901.

In some implementations, at step 903, control circuitry of client device 901 (e.g., computing device 202, user device 403) initializes a buffer (e.g., a play buffer or a display buffer 516) (to store decoded frames of the content item and the supplemental content item.

In some implementations, at step 904, control circuitry (e.g., control circuitry 210 shown in FIG. 2) of server 905 (e.g., server 204, server 405) receives a request for the content item from client device 901 (e.g., computing device 202, user device 403) via I/O paths (e.g., I/O paths 212 depicted in FIG. 2) of server 905 and the communication network.

In some embodiments, at step 906, control circuitry of server 905 (e.g., server 204, server 405) sends a content item manifest (e.g. manifest 407*a*) to client device 901 (e.g., computing device 202, user device 403) via I/O paths of server 905 and the communication network. In some examples, the content item manifest (e.g. manifest 407*a*) contains information about the supplemental content item segments. In some examples, control circuitry of server 905 (e.g., server 204, server 405) sends a content item manifest (e.g. manifest 407*a*) and a supplemental content manifest (e.g., manifest 407*b*) to client device 901 (e.g., computing device 202, user device 403) via I/O paths of server 905 and the communication network.

In some implementations, at step 908, control circuitry of server 905 (e.g., server 204, server 405) receives a request for content item segments, from client device 901 (e.g., computing device 202, user device 403), using the content item manifest (e.g. manifest 407a) via I/O paths of server 905 and the communication network.

In some embodiments, at step 910, control circuitry of server 905 (e.g., server 204, server 405) accesses a supplemental content insertion logic (e.g., example of supplemental content insertion logic shown in step 410 of FIG. 4) possibly via I/O paths of server 905 to identify an default supplemental content insertion point between a first segment of the content item and a second segment of the content item, wherein the first segment and second segment are two consecutive segments. Both the number of content item segments (after which supplemental content item segments are inserted) and the number of supplemental content item segments to be inserted are set to any figures determined by the supplemental content insertion logic. In some examples, non-transitory computer-readable instructions encoded on a non-transitory computer-readable medium and executed by control circuitry of the server 905 comprise the supplemental content insertion logic.

In some implementations, at step 912, control circuitry of server 905 (e.g., server 204, server 405) analyzes the first segment of the content item and the second segment of the content item to identify a natural supplemental content insertion point. Control circuitry of server 905 runs an analytic agent to analyze the first segment and the second segment, close to the default supplemental content insertion point so as to identify a natural break point within the first segment or the second segment. In some examples, non-transitory computer-readable instructions encoded on a non-transitory computer-readable medium and executed by control circuitry of server 801 comprise instructions to control the analytic agent that identifies a natural supplemental content insertion point within one of the first segment and the second segment. In some instances, the instructions to control the analytic agent comprises a machine learning model, which distinguishes words of various languages from encoded audio data and closed captions from encoded frames and can identify the beginning and end of sentences, songs and music and monochromatic frames.

In some embodiments, at step 914, control circuitry of server 905 (e.g., server 204, server 405) transmits a modified manifest for the content item indicating the natural supplemental content insertion point (e.g., natural break point 427b shown in FIG. 4) in one of the first segment of the content item and the second segment of the content item via I/O paths of server 905 and the communication network. By transmitting the manifest for the content item, server 905 causes client device 901 (e.g., computing device 202, user device 403) to perform steps 922-930 in the following order: step 922, any one of steps 924 to 928, any one of steps 924 to 928 that has not been implemented yet, any one of steps 924 to 928 that has not been implemented yet and finally step 930.

In some implementations, at step 916, control circuitry of server 905 (e.g., server 204, server 405) receives a request for supplemental content item segments, from client device 901 (e.g., computing device 202, user device 403), using supplemental content item manifest (e.g., manifest 407b), via I/O paths of server 905 and the communication network.

In some embodiments, at step 918, control circuitry of server 905 (e.g., server 204, server 405) sends supplemental content item segments to client device 901 (e.g., computing device 202, user device 403) via I/O paths of server 905 and the communication network. (There is no step 920.)

In some embodiments, at step 922, control circuitry of client device 901 (e.g., computing device 202, user device 403) overrides insertion of the supplemental content item at the default supplemental content insertion point.

In some implementations, at step 924, control circuitry of client device 901 (e.g., computing device 202, user device 403) decodes a first set of frames of the content item up to the natural supplemental content insertion point (using a first decoder e.g., decoder 504 in FIG. 5) and places the first set of frames into the buffer.

In some embodiments, at step 926, control circuitry of client device 901 (e.g., computing device 202, user device 403) decodes a second set of frames of the supplemental content item (using a second decoder e.g., decoder 510 in FIG. 5) and places the second set of frames into the buffer.

In some implementations, at step 928, control circuitry of client device 901 (e.g., computing device 202, user device 403) decodes a third set of frames of the content item from the natural supplemental content insertion point and places the third set of frames into the buffer.

In some embodiments, at step 930, control circuitry of client device 901 (e.g., computing device 202, user device 403) plays frames from the buffer via I/O paths of client device 901. In some examples, at step 930, control circuitry of client device 901 plays the decoded frames located in the display buffer (e.g., buffer 516 in FIG. 5) in the order of receipt, by the display buffer, of the decoded frames i.e.,/first set of frames/second set of frames/third set of frames/. In some examples, at step 930, a buffer manager (e.g., buffer manager 516 in FIG. 5) maintains the playing order of the decoded frames as/first set of frames/second set of frames/third set of frames/irrespective of the order of receipt, by the display buffer, of the decoded frames. In some instances, non-transitory computer-readable instructions encoded on a non-transitory computer-readable medium and executed by control circuitry of client device 901 comprise instructions controlling the buffer manager.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   sending a request for a content item;
   receiving at least a manifest for the content item;
   accessing supplemental content insertion logic to identify a default supplemental content insertion point, based on the supplemental content insertion logic, between a first segment of the content item and a second segment of the content item, wherein the first segment and second segment are two consecutive segments;
   analyzing the first segment of the content item and the second segment of the content item to identify a natural supplemental content insertion point within the first segment or the second segment;

in response to the identifying the natural supplemental content insertion point:

overriding insertion of a supplemental content item at the default supplemental content insertion point;

decoding a first set of frames of the content item up to the natural supplemental content insertion point and placing the first set of frames into a buffer;

decoding a second set of frames of the supplemental content item and placing the second set of frames into the buffer;

decoding a third set of frames of the content item, from the natural supplemental content insertion point, and placing the third set of frames into the buffer; and playing frames from the buffer.

2. The method of claim 1, further comprising:

receiving a manifest for the supplemental content item;

receiving the first segment of the content item and the second segment of the content item using addresses provided by the manifest for the content item; and receiving segments of the supplemental content item using addresses provided by the manifest for the supplemental content item.

3. The method of claim 1, wherein the identifying the natural supplemental content insertion point within the first segment or the second segment comprises:

identifying a portion of the first segment or the second segment, that does not comprise closed captions.

4. The method of claim 1, wherein the identifying the natural supplemental content insertion point within the first segment or the second segment comprises:

identifying a portion of the first segment or the second segment, that is associated with audio data of the content item that do not comprise speech.

5. The method of claim 1, wherein the supplemental content insertion logic is configured to identify the default supplemental content insertion point by setting a value corresponding to a number of segments of a sequence of segments of the content item intended to be played before starting playing segments of the supplemental content item, wherein the first segment is a last segment of the sequence of segments of the content item and the value corresponds to a place of the first segment in the sequence of segments of the content item.

6. The method of claim 1, wherein the identifying the natural supplemental content insertion point comprises:

identifying a plurality of natural supplemental content insertion points within any one of the first segment and the second segment; and selecting a closest natural supplemental content insertion point from the plurality of natural supplemental content insertion points.

7. The method of claim 1, wherein the overriding insertion of the supplemental content item at the default supplemental content insertion point occurs in response to having the default supplemental content insertion point placed in between a boundary portion of the first segment and a boundary portion of the second segment, both the boundary portion of the first segment and the boundary portion of the second segment comprising closed captions.

8. The method of claim 1, wherein the overriding insertion of the supplemental content item at the default supplemental content insertion point occurs in response to having the default supplemental content insertion point placed in between a boundary portion of the first segment and a boundary portion of the second segment, both the boundary portion of the first segment and the boundary portion of the second segment being associated with audio data of the content item that comprise speech.

9. The method of claim 1, wherein the playing frames from the buffer comprises sequentially playing, from the buffer, the first set of frames, the second set of frames and the third set of frames.

10. The method of claim 9, wherein the sequentially playing, from the buffer, the first set of frames, the second set of frames and the third set of frames comprises:

playing audio data associated with the first set of frames while playing the first set of frames;

playing audio data associated with the second set of frames while playing the second set of frames; and playing audio data associated with the third set of frames while playing the third set of frames.

11. The method of claim 1, wherein:

the decoding the first set of frames comprises decoding, by a first decoder, the first set of frames;

the decoding the second set of frames comprises decoding, by a second decoder, the second set of frames; and the decoding the third set of frames comprises decoding, by the first decoder, the third set of frames; and wherein the first decoder and the second decoder operate simultaneously.

12. A system comprising:

input/output circuitry configured to:

send a request for a content item; and receive at least a manifest for the content item; and control circuitry configured to:

access supplemental content insertion logic to identify a default supplemental content insertion point, based on the supplemental content insertion logic, between a first segment of the content item and a second segment of the content item, wherein the first segment and second segment are two consecutive segments;

analyze the first segment of the content item and the second segment of the content item to identify a natural supplemental content insertion point within the first segment or the second segment; and in response to the identifying the natural supplemental content insertion point:

override insertion of a supplemental content item at the default supplemental content insertion point;

decode a first set of frames of the content item up to the natural supplemental content insertion point and placing the first set of frames into a buffer;

decode a second set of frames of the supplemental content item and placing the second set of frames into the buffer;

decode a third set of frames of the content item, from the natural supplemental content insertion point, and placing the third set of frames into the buffer; and play frames from the buffer.

13. The system of claim 12, wherein the input/output circuitry is further configured to:

receive a manifest for the supplemental content item;

receive the first segment of the content item and the second segment of the content item using addresses provided by the manifest for the content item; and receive segments of the supplemental content item using addresses provided by the manifest for the supplemental content item.

14. The system of claim 12, wherein the control circuitry is configured to identify the natural supplemental content insertion point within the first segment or the second segment by:

identifying a portion of the first segment or the second segment, that does not comprise closed captions.

15. The system of claim 12, wherein the control circuitry is configured to identify the natural supplemental content insertion point within the first segment or the second segment by:

identifying a portion of the first segment or the second segment, that is associated with audio data of the content item that do not comprise speech.

16. The system of claim 12, wherein the supplemental content insertion logic is configured to identify the default supplemental content insertion point by setting a value corresponding to a number of segments of a sequence of segments of the content item intended to be played before starting playing segments of the supplemental content item, wherein the first segment is a last segment of the sequence of segments of the content item and the value corresponds to a place of the first segment in the sequence of segments of the content item.

17. The system of claim 12, wherein the control circuitry is configured to identify the natural supplemental content insertion point by:

identifying a plurality of natural supplemental content insertion points within any one of the first segment and the second segment; and selecting a closest natural supplemental content insertion point from the plurality of natural supplemental content insertion points.

18. The system of claim 12, wherein the control circuitry is configured to override the insertion of the supplemental content item at the default supplemental content insertion point in response to having the default supplemental content insertion point placed in between a boundary portion of the first segment and a boundary portion of the second segment, both the boundary portion of the first segment and the boundary portion of the second segment being associated with audio data of the content item that comprise speech.

19. The system of claim 12, wherein the control circuitry is configured to play frames from the buffer, by sequentially playing, from the buffer, the first set of frames, the second set of frames and the third set of frames.

20. A system comprising:

means for sending a request for a content item;

means for receiving at least a manifest for the content item;

means for accessing supplemental content insertion logic to identify a default supplemental content insertion point, based on the supplemental content insertion logic, between a first segment of the content item and a second segment of the content item, wherein the first segment and second segment are two consecutive segments;

means for analyzing the first segment of the content item and the second segment of the content item to identify a natural supplemental content insertion point within the first segment or the second segment; and means for, in response to the identifying the natural supplemental content insertion point:

overriding insertion of a supplemental content item at the default supplemental content insertion point;

decoding a first set of frames of the content item up to the natural supplemental content insertion point and placing the first set of frames into a buffer;

decoding a second set of frames of the supplemental content item and placing the second set of frames into the buffer;

decoding a third set of frames of the content item, from the natural supplemental content insertion point, and placing the third set of frames into the buffer; and playing frames from the buffer.

*    *    *    *    *